US012002458B1

(12) United States Patent
Gao et al.

(10) Patent No.: US 12,002,458 B1
(45) Date of Patent: Jun. 4, 2024

(54) AUTONOMOUSLY MOTILE DEVICE WITH COMMAND PROCESSING

(71) Applicant: Amazon Technologies, Inc., Seattle, WA (US)

(72) Inventors: Qiaozi Gao, San Mateo, CA (US); Govindarajan Sundaram Thattai, Fremont, CA (US); Qing Ping, Santa Clara, CA (US); Joel Joseph Chengottusseriyil, San Jose, CA (US); Feiyang Niu, Hayward, CA (US); Gokhan Tur, Los Altos, CA (US); Dilek Hakkani-Tur, Los Altos, CA (US)

(73) Assignee: Amazon Technologies, Inc., Seattle, WA (US)

( * ) Notice: Subject to any disclaimer, the term of this patent is extended or adjusted under 35 U.S.C. 154(b) by 351 days.

(21) Appl. No.: 17/012,257

(22) Filed: Sep. 4, 2020

(51) Int. Cl.
 *G10L 15/22* (2006.01)

(52) U.S. Cl.
 CPC .................. *G10L 15/22* (2013.01)

(58) Field of Classification Search
 None
 See application file for complete search history.

(56) References Cited

U.S. PATENT DOCUMENTS

| | | | |
|---|---|---|---|
| 9,311,917 B2 * | 4/2016 | Comerford | G10L 17/22 |
| 9,922,642 B2 * | 3/2018 | Pitschel | G10L 15/063 |
| 11,417,328 B1 * | 8/2022 | Katta | G06F 40/20 |
| 2004/0044516 A1 * | 3/2004 | Kennewick | G10L 15/1822 704/E15.04 |
| 2009/0299751 A1 * | 12/2009 | Jung | G10L 15/26 901/50 |
| 2010/0185445 A1 * | 7/2010 | Comerford | G10L 15/22 704/E15.001 |
| 2011/0208524 A1 * | 8/2011 | Haughay | G10L 17/08 704/E15.001 |
| 2014/0324429 A1 * | 10/2014 | Weilhammer | G10L 15/1815 704/244 |
| 2015/0154976 A1 * | 6/2015 | Mutagi | G06F 3/167 704/275 |
| 2016/0358603 A1 * | 12/2016 | Azam | G10L 15/26 |
| 2017/0133009 A1 * | 5/2017 | Cho | G10L 15/183 |
| 2018/0040324 A1 * | 2/2018 | Wilberding | G10L 17/22 |
| 2018/0096681 A1 * | 4/2018 | Ni | G10L 15/063 |
| 2019/0057696 A1 * | 2/2019 | Ogawa | A61B 1/0627 |
| 2019/0094038 A1 * | 3/2019 | Oh | B60R 16/0373 |
| 2019/0102377 A1 * | 4/2019 | Neuman | G06F 40/284 |
| 2019/0103103 A1 * | 4/2019 | Ni | G10L 15/1822 |
| 2019/0107833 A1 * | 4/2019 | Song | G05D 1/0246 |
| 2019/0210849 A1 * | 7/2019 | High | H04N 13/282 |
| 2019/0235887 A1 * | 8/2019 | Hemaraj | G06F 3/167 |
| 2019/0266237 A1 * | 8/2019 | Ray | G10L 15/075 |
| 2019/0311721 A1 * | 10/2019 | Edwards | G10L 17/06 |
| 2019/0361978 A1 * | 11/2019 | Ray | G06F 40/30 |

(Continued)

*Primary Examiner* — Jonathan C Kim
(74) *Attorney, Agent, or Firm* — Pierce Atwood LLP

(57) ABSTRACT

A device capable of autonomous motion may move in an environment and may receive audio data from a microphone. If the device receives a command represented in the audio data that is absent from a set of known commands, the device may prompt the user to explain how to perform the command. The device may save a command template corresponding to the command, which may be used to perform future commands.

18 Claims, 19 Drawing Sheets

(56) References Cited

U.S. PATENT DOCUMENTS

| | | | |
|---|---|---|---|
| 2020/0007684 A1* | 1/2020 | Chang | G06Q 30/016 |
| 2020/0051563 A1* | 2/2020 | Oh | G10L 15/22 |
| 2020/0051580 A1* | 2/2020 | Seo | G10L 15/20 |
| 2020/0125321 A1* | 4/2020 | Fox | G10L 15/25 |
| 2020/0175976 A1* | 6/2020 | Rakshit | H04L 67/125 |
| 2020/0177410 A1* | 6/2020 | Iyengar | G06F 3/167 |
| 2020/0219507 A1* | 7/2020 | Jun | G10L 15/22 |
| 2020/0226356 A1* | 7/2020 | Shin | B25J 13/003 |
| 2020/0310749 A1* | 10/2020 | Miller | G06F 3/167 |
| 2020/0312318 A1* | 10/2020 | Olson | G10L 15/22 |
| 2020/0339142 A1* | 10/2020 | Aggarwal | B60R 16/0373 |
| 2021/0005191 A1* | 1/2021 | Chun | G10L 15/30 |
| 2021/0086353 A1* | 3/2021 | Shah | G06V 20/10 |
| 2021/0295839 A1* | 9/2021 | Xu | H04M 1/72448 |
| 2021/0331314 A1* | 10/2021 | Chae | A47L 9/2857 |
| 2021/0383806 A1* | 12/2021 | Kim | G06F 3/16 |
| 2021/0398524 A1* | 12/2021 | Gao | G10L 15/26 |
| 2022/0343910 A1* | 10/2022 | Lam | G06N 7/01 |

\* cited by examiner

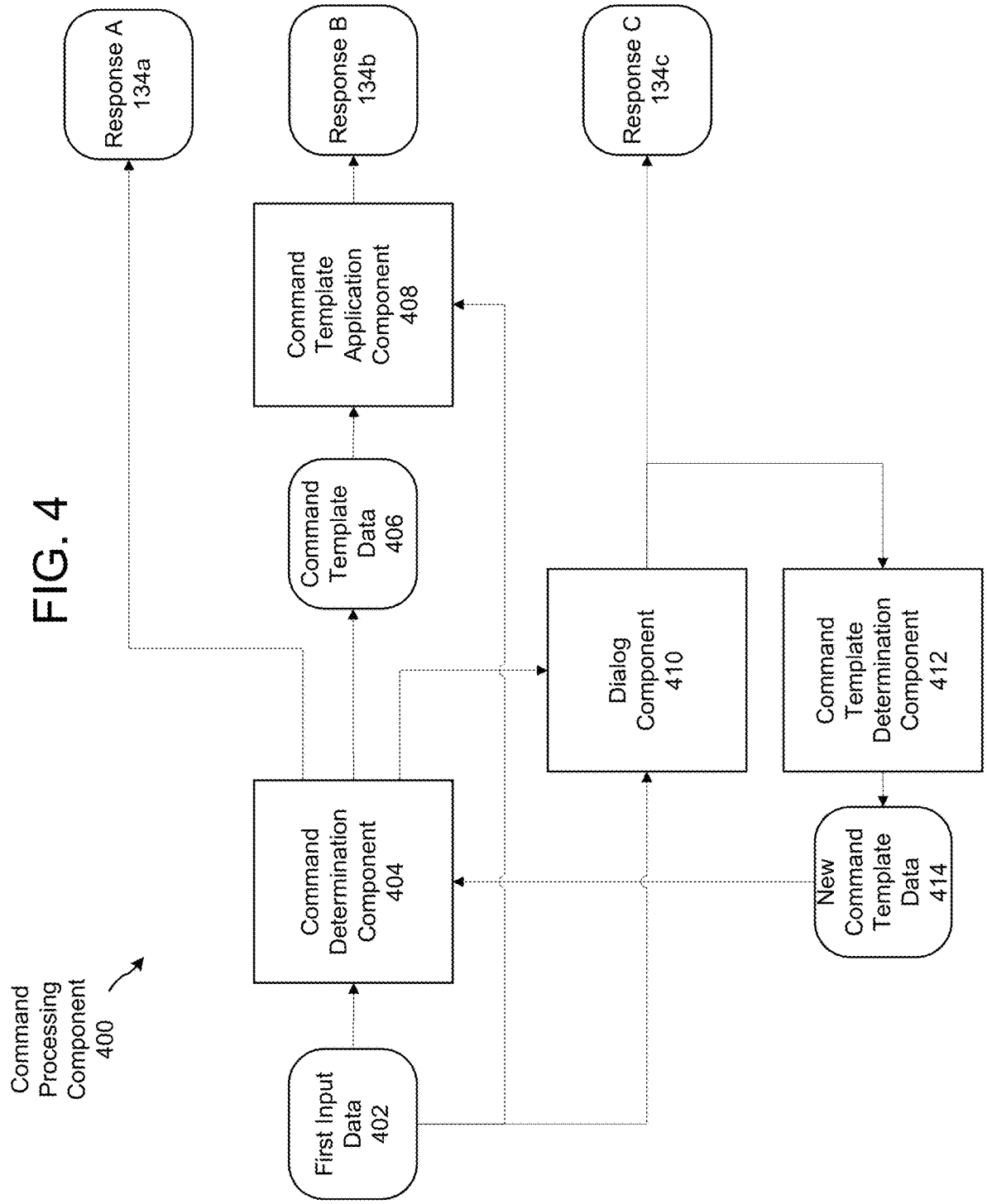

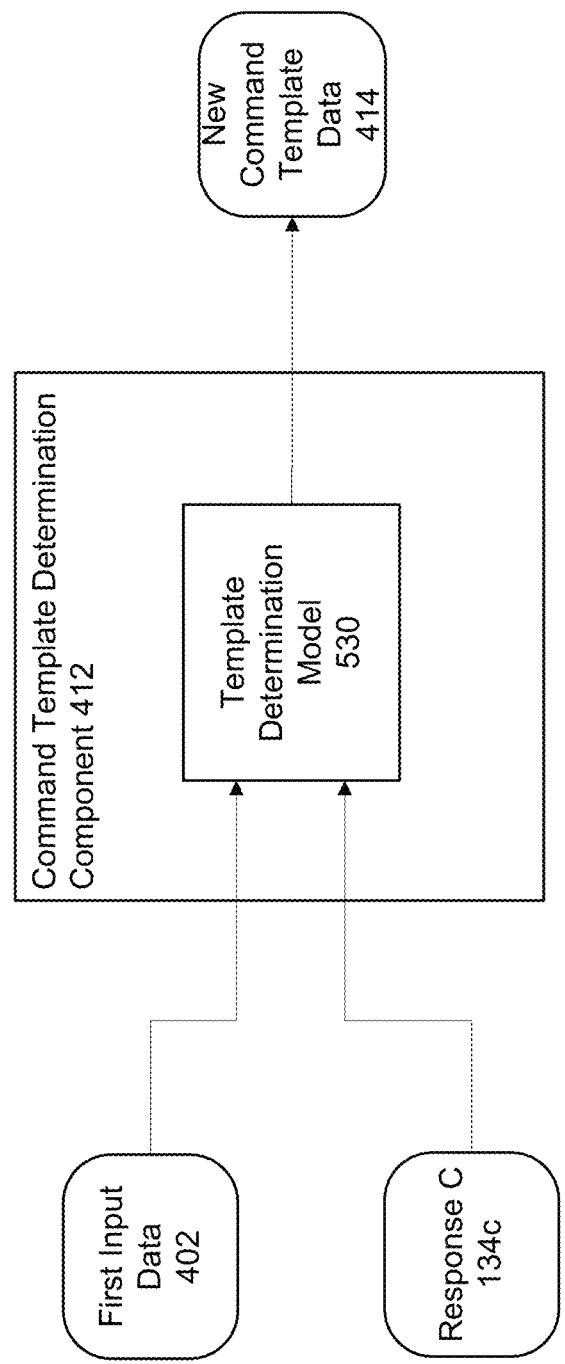

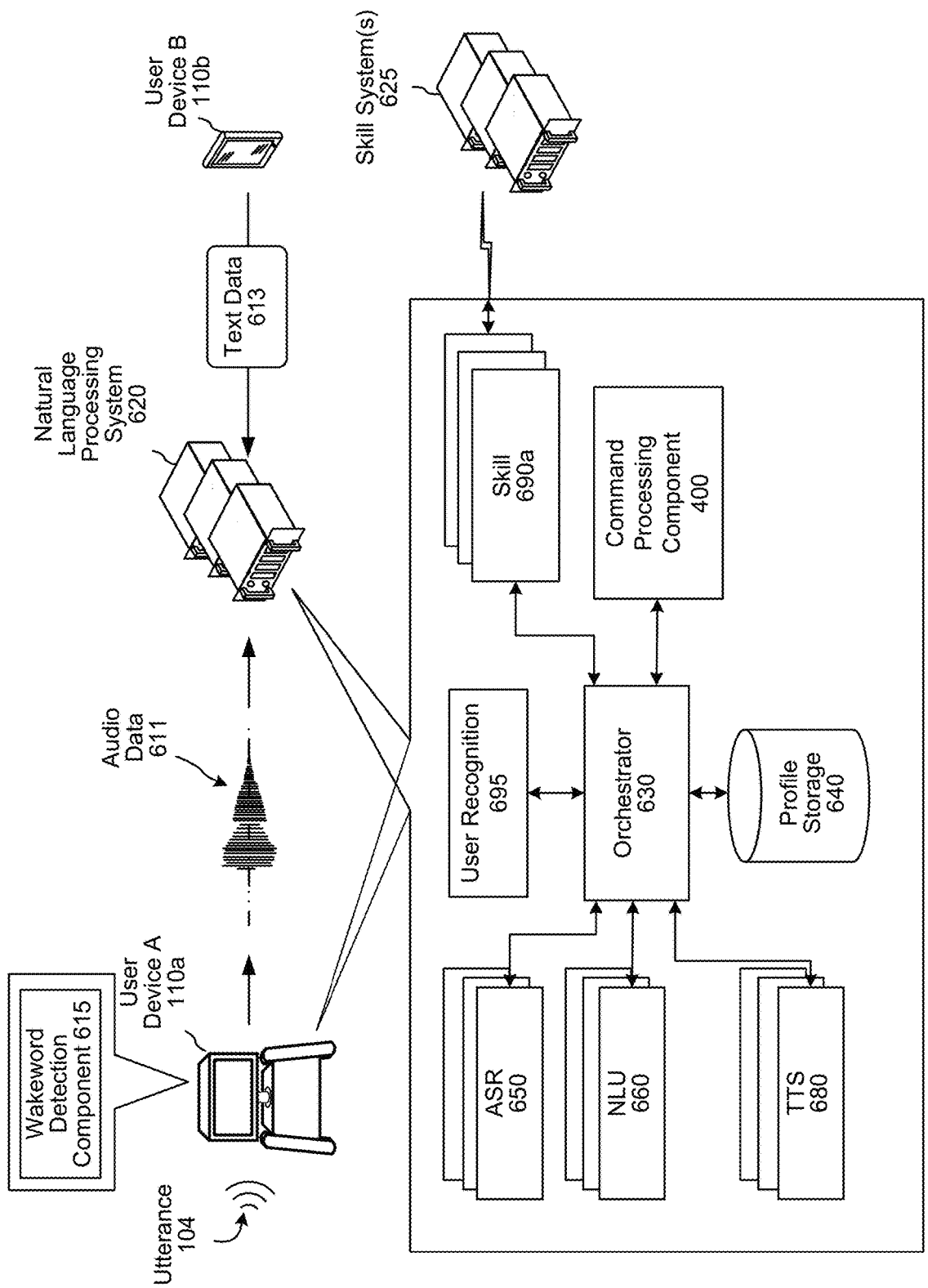

AUTONOMOUSLY MOTILE DEVICE WITH COMMAND PROCESSING

BACKGROUND

A computing device may be an autonomously motile device and may include at least one microphone for capturing audio, which may include a representation of an utterance, in an environment of the computing device. Techniques may be used to process audio data received from the microphone to determine and act on the utterance. The device may cause further processing to be performed on the processed audio data.

BRIEF DESCRIPTION OF DRAWINGS

For a more complete understanding of the present disclosure, reference is now made to the following description taken in conjunction with the accompanying drawings.

FIG. 4 illustrates components of an autonomously motile device configured for command processing according to embodiments of the present disclosure.

FIGS. 5A, 5B, 5C, 5D, and 5E illustrate further details of components of an autonomously motile device configured for command processing according to embodiments of the present disclosure.

FIG. 6 illustrates a remote system configured for command processing according to embodiments of the present disclosure.

DETAILED DESCRIPTION

Figure 1:
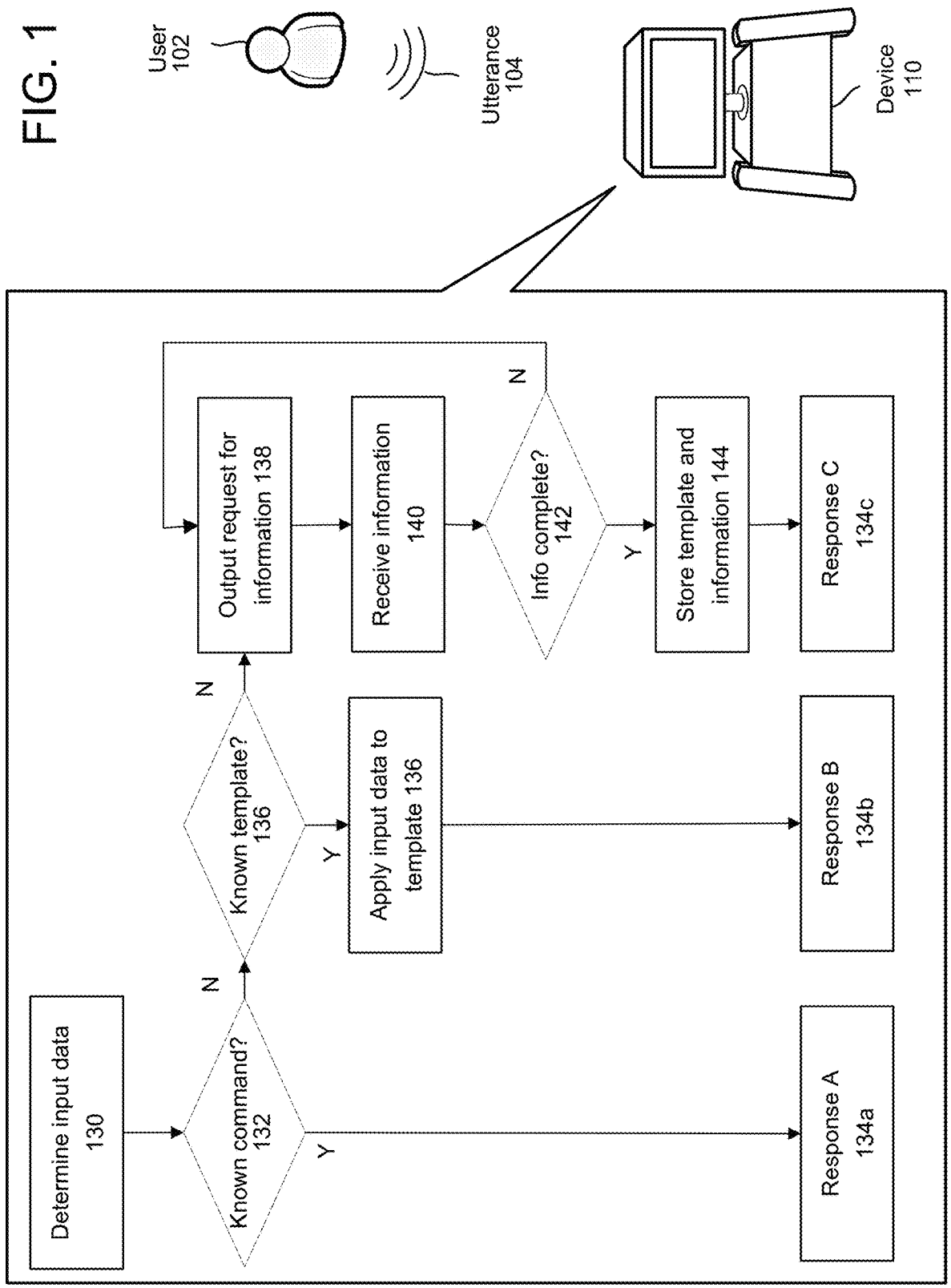
FIG. 1 illustrates a system and method for command processing according to embodiments of the present disclosure.

A device such as an autonomously motile device—e.g., a robot—may be a device capable of movement of itself, and/or of components of itself, within an environment. The device may include, among other components, one or more microphones that are capable of sensing audio present in the environment and transforming that audio into audio data. The audio data may include a representation of an utterance of a user. The autonomously motile device may process the audio data, as described herein, and then cause further processing to be performed on the processed audio data. This further processing may include performing automatic-speech recognition (ASR) and/or natural-language understanding (NLU) processing and/or causing the processed audio data to be output by a second device as part of, for example, audio and/or video communication. Alternatively, the further processing may include other operations such as acoustic event detection where audio data is used to determine if a certain event has occurred (such as a garage door opening, door closing, etc.). The device may execute a response to a command represented in the audio data based on this processing; the response may include outputting audio, outputting video, moving in the environment, and/or moving a component of the device.

Although the disclosure herein references an autonomously motile device, the present disclosure is not limited thereto, and embodiments of the present disclosure include non-motile (e.g., stationary) devices. Examples of such devices include voice-controlled devices, such as smart speakers and Internet of Things devices, computers, laptops, and/or tablet computers.

The autonomously motile device may recognize a command in a set of known commands that each correspond to a response in a set of known responses. Such commands may include responses in the known set of responses that do not include motion of the autonomously motile device (e.g., "Tell me the weather forecast for tomorrow") and/or commands that include responses in the known set of responses that do include motion (e.g., "Go to the kitchen"). The autonomously motile device may, when these commands are received, determine and execute the corresponding response.

In some embodiments, however, the autonomously motile device may determine that an input command is absent from the set of known commands, even though aspects of the audio are successfully converted to a machine representation (e.g., named entities are identified, specific intent is identified, etc.). In these embodiments, the autonomously motile device may prompt the user (by, for example outputting audio) to define the input command as a set of one or more other, known commands. If the audio data received from the user in response to the prompt includes only known commands, the autonomously motile device and/or other system (e.g., remote speech processing system) may then cause output in accordance with the known commands. If the audio data received from the user includes additional unknown commands, the autonomously motile device may further prompt the user to further define the additional unknown commands as known commands. This prompting by the autonomously motile device may continue until the original input command is defined by one or more known commands and/or until the autonomously motile device determines that it is unable to execute a response to the input command. The autonomously motile device may further determine a command template corresponding to the input command; the command template may include categories corresponding to specific entities represented in the input command, such as the category "[LOCATION]" in place of a specific entity such as "kitchen" or "living room." The autonomously motile device may store the template and its associated set of known commands and may re-use the template to perform future commands.

FIG. 1 illustrates a system that includes an autonomously motile device 110, which is described in greater detail below. In various embodiments, the autonomously motile device 110 is capable of autonomous motion using one or more motors powering one or more wheels, treads, robotic limbs, or similar actuators. The autonomously motile device 110 may further be capable of three-dimensional motion (e.g., flight) using one or more rotors, wings, jets, electromagnetic field generators, or similar actuators. The motion may be linear motion and/or angular motion. The present disclosure is not limited to particular method of autonomous movement/motion. The device 110 may, for example, follow a user 102 in an environment to thereby allow the user 102 easier access to features of the device 110, such as its voice interface. For example, the user 102 may utter a command, represented by an utterance 104, that is received by the device 110. The device 110 may further move in the environment in response to input from the user 102, which may be in the form of an utterance (e.g., "Follow me" or "Go to the kitchen") and/or input from a second user device, such as a tablet computer. The device 110 may further move in the environment in accordance with predetermined instructions, such as moving to different rooms of the environment at a determined time and capturing image data (e.g., a "sentry" mode).

Figure 10:
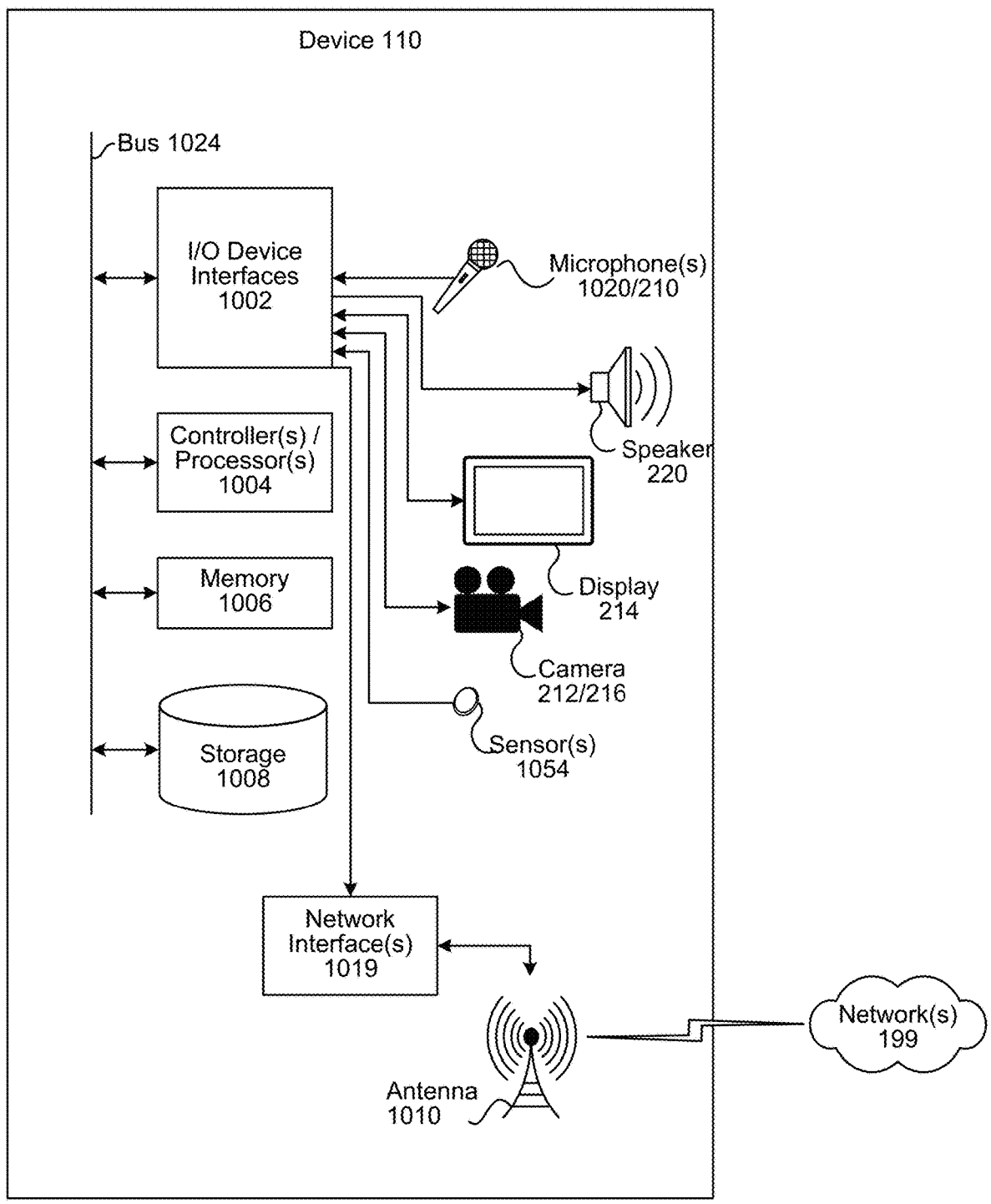
FIG. 10 illustrates a block diagram of an autonomously motile device according to embodiments of the present disclosure.

The device 110 may contain a number of other systems or components, as described in greater detail herein. For example, the device 110 may include one or more display screens for displaying information to a user 102 and/or receiving touch input from a user. The device 110 may include a loudspeaker to output audio to the user 102, such as audio related to a command or audio related to a request. The device 110 may further include one or more sensors, as explained in greater detail below with respect to FIG. 11C. These sensors may include, but are not limited to, an accelerometer, a gyroscope, a magnetic field sensor, an orientation sensor, a weight sensor, a temperature sensor, and/or a location sensor (e.g., a global-positioning system (GPS) sensor or a Wi-Fi round-trip time sensor). The device may further include a computer memory, a computer processor, and one or more network interfaces, as shown in FIG. 10. In some embodiments, the device 110 is capable of rotation but not linear motion; the device 110 may be mounted or placed on a surface or floor, for example, and may rotate in place to face a user 102. The disclosure is not, however, limited to only these systems or components, and the device 110 may include additional components without departing from the disclosure.

In various embodiments, with reference to FIG. 1, the autonomously motile device 110 determines (130) first input data representing a first input command to an autonomously motile device. The first input data may be audio data representing, for example, the utterance 104 of the user 102. The first input data may instead or in addition be text data; this text data may be, for example, received from a user device, such as a smartphone or other device. The text data may instead or in addition include a representation of the utterance as a result of processing the audio data using ASR techniques. This text data may be textual characters representing words of the utterance, phonemes representing sounds of the utterance, or any other textual representation of the utterance. The input data may also be or include image data, such as image data representing a gesture of the user 102.

If the autonomously motile device 110 determines that the first input data corresponds to a known command, the autonomously motile device 110 outputs a corresponding response A 134a. However, the autonomously motile device 110 may determine (132) that the first input data corresponds to a command absent from a set of known commands. That is, the device 110 may determine that the command corresponding to the input data is not present or otherwise represented in the set of known commands. Before prompting the user to explain the command, however, the autonomously motile device 110 may determine (136) that the command corresponds to a known command template. As explained in greater detail herein, the autonomously motile device 110 may have previously associated a previous unknown command with one or more known commands (e.g., the autonomously motile device 110 had previously "learned" a command) and may have determined and stored a command template associated with the unknown command. The command template may include one or more generic categories corresponding to specific entities represented in a command; the specific entities of later-received commands may correspond to these generic categories and, if so, the command template and the unknown command may be used to cause the output response 134b. For example, if a first unknown command is, "Deliver this cup to the kitchen," the autonomously motile device 110 may prompt for and associate one or more known commands with that first unknown command. The autonomously motile device 110 may also, however, further associate a template, "Deliver [OBJECT] to [LOCATION]," with the one or more known commands, wherein "[OBJECT]" and "[LOCATION]" are categories. If, for example, the autonomously motile device 110 later receives a second unknown command, "Deliver this remote to the living room," the autonomously motile device 110 may determine that "remote" corresponds to "[OBJECT]" and that "living room" corresponds to "[LOCATION]", and then execute the previously-determined known commands associated with the command template.

If the first command is not associated with a command template, the autonomously motile device 110 may determine and cause output (138) of first data representing a request for information corresponding to an explanation of the command. The request for information may be an open-ended request (e.g., "How shall I do that") and/or a guided series of requests (e.g., "How many steps are there?", "What is the first step?", and "What is the second step?", and so on. The autonomously motile device 110 may receive (140) second input data in response; this second input data may be audio and/or image data from the user 102 describing the steps of the unknown command.

The autonomously motile device 110 determines (142) that a first stored command of the set of known commands corresponds to at least a first portion (e.g., a first step) of the second input data. If the autonomously motile device 110 determines that additional known commands are required to respond to the unknown command, the autonomously motile device 110 may cause this process to repeat and again output (138) a request for information. If, on the other hand, the autonomously motile device 110 determines that no additional known commands are required to respond to the unknown command, the autonomously motile device 110c outputs a corresponding response (134c). The autonomously motile device 110 may also store (144) a command template corresponding to the unknown command and including the known commands that correspond to the known command.

Figure 2:
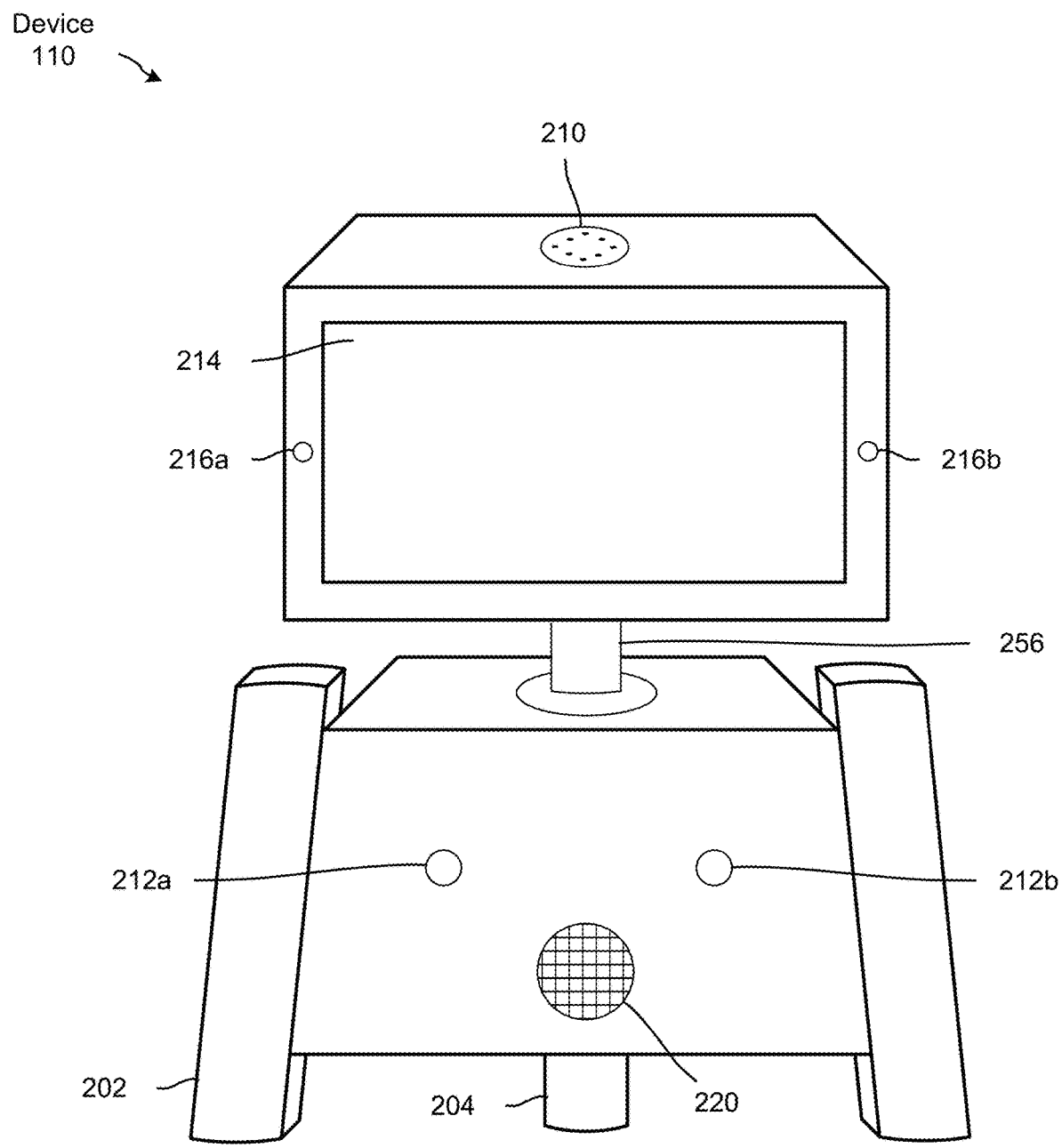
FIG. 2 illustrates a view of an autonomously motile device according to embodiments of the present disclosure.

FIG. 2 illustrates a view of the autonomously motile device 110 according to various embodiments of the present disclosure. The device 110 includes wheels 202 that are disposed on left and right sides of the device 110. The wheels 202 may be canted inwards toward an upper structure of the device 110. In other embodiments, however, the wheels 202 may be mounted vertically (e.g., not canted) or canted away from the upper structure. A caster 204 (e.g., a smaller wheel) may disposed along a midline of the device 110.

The front section of the device 110 may include a variety of external sensors. A first set of optical sensors, for example, may be disposed along the lower portion of the front of the device 110, and a second set of optical sensors may be disposed along an upper portion of the front of the device 110. A microphone array 210 may be disposed on a top surface of the device 110; the microphone array 210 may, however, be disposed on any surface of the device 110.

One or more cameras 212 may be mounted to the front of the device 110; two cameras 212a and 212b, for example, may be used to provide for stereo vision. The distance between the two cameras 212 may be, for example, 5-15 centimeters; in some embodiments, the distance is 10 centimeters. In some embodiments, the cameras 212 may exhibit a relatively wide horizontal field-of-view 308. For example, the horizontal field-of-view 308 may be between 90° and 110°. A relatively wide field-of-view 308 may provide for easier detection of moving objects, such as users or pets, which may be in the path of the device 110. Also, the relatively wide field-of-view 308 may provide for the device 110 to more easily detect objects when rotating or turning.

The cameras 212, which may be used for navigation as described herein, may be of different resolution from, or sensitive to different wavelengths than, other cameras used for other purposes, such as video communication. For example, the navigation cameras 212 may be sensitive to infrared light allowing the device 110 to operate in darkness or semi-darkness, while a camera 216 mounted on a mast 256 may be sensitive to visible light and may be used to generate images suitable for viewing by a person. A navigation camera 212 may have a resolution of at least 300 kilopixels each, while the camera 216 may have a resolution of at least 10 megapixels. In other implementations, navigation may utilize a single camera. The camera 216 that is mounted on the mast 256 that may extend vertically with respect to the device 110.

The cameras 212 may operate to provide stereo images of the environment, the user, or other objects. For example, an image from the camera 216 disposed above the display 214 may be accessed and used to generate stereo-image data corresponding to a face of a user. This stereo-image data may then be used for facial recognition, user identification, gesture recognition, gaze tracking, and other uses. In some implementations, a single camera 216 may be disposed above the display 214.

The display 214 may be mounted on a movable mount. The movable mount may allow the display to move along one or more degrees of freedom. For example, the display 214 may tilt, pan, change elevation, and/or rotate. In some embodiments, the display 214 may be approximately 20 centimeters as measured diagonally from one corner to another. An ultrasonic sensor may be mounted on the front of the device 110 and may be used to provide sensor data that is indicative of objects in front of the device 110. Additional cameras 212a, 212b may be mounted on a housing of the display 214.

One or more loudspeakers 220 may be mounted on the device 110, and the loudspeakers 220 may have different audio properties. For example, low-range, mid-range, and/or high-range loudspeakers 220 may be mounted on the front of the device 110. The loudspeakers 220 may be used to provide audible output such as alerts, music, human speech such as during a communication session with another user, and so forth.

Other output devices, such as one or more lights, may be disposed on an exterior of the device 110. For example, a running light may be arranged on a front of the device 110. The running light may provide light for operation of one or more of the cameras, a visible indicator to the user that the device 110 is in operation, or other such uses.

One or more floor optical-motion sensors may be disposed on the underside of the device 110. The floor optical-motion sensors may provide indication indicative of motion of the device 110 relative to the floor or other surface underneath the device 110. In some embodiments, the floor optical-motion sensors comprise a light source, such as light-emitting diode (LED) and/or an array of photodiodes. In some implementations, the floor optical-motion sensors may utilize an optoelectronic sensor, such as an array of photodiodes. Several techniques may be used to determine changes in the data obtained by the photodiodes and translate this into data indicative of a direction of movement, velocity, acceleration, and so forth. In some implementations, the floor optical-motion sensors may provide other information, such as data indicative of a pattern present on the floor, composition of the floor, color of the floor, and so forth. For example, the floor optical-motion sensors may utilize an optoelectronic sensor that may detect different colors or shades of gray, and this data may be used to generate floor characterization data.

An ultrasonic sensor and an optical sensor may be disposed on either side of the device 110. The disposition of components of the device 110 may be arranged such that a center of gravity is located between a wheel axle of the front wheels 202 and the caster 204. Such placement of the center of gravity may result in improved stability of the device 110 and may also facilitate lifting by a carrying handle. The caster 204 may be disposed in a trailing configuration, in which the caster 204 is located behind or aft of the wheel axle and the center of gravity. In other implementations, however, the caster 204 may be in front of the axle of the wheels 202. For example, the caster 204 may be a leading caster 204 positioned forward of the center of gravity.

The device 110 may encounter a variety of different floor surfaces and transitions between different floor surfaces during the course of its operation. A contoured underbody may transition from a first height at the front of the device 110 to a second height that is proximate to the caster 204. This curvature may provide a ramp effect such that, if the device 110 encounters an obstacle that is below the first height, the contoured underbody helps direct the device 110 over the obstacle without lifting the driving wheels 202 from the floor.

A first pair of optical sensors may be located along the lower edge of a rear of the device 110, while a second pair of optical sensors are located along an upper portion of the rear of the device 110. An ultrasonic sensor may provide proximity detection for objects that are behind the device 110. Charging contacts may be provided on the rear of the device 110. The charging contacts may include electrically conductive components that may be used to provide power (to, e.g., charge a battery) from an external source such as a docking station to the device 110. In other implementations, wireless charging may be utilized. For example, wireless inductive or wireless capacitive charging techniques may be used to provide electrical power to the device 110.

In some embodiments, the wheels 202 may include an electrically conductive portion and provide an electrical conductive pathway between the device 110 and a charging source disposed on the floor. One or more data contacts may be arranged along the back of the device 110. The data contacts may be configured to establish contact with corresponding base data contacts within the docking station. The data contacts may provide optical, electrical, or other connections suitable for the transfer of data. Other output devices, such as one or more lights, may be disposed on an exterior of the back of the device 110. For example, a brake light may be arranged on the back surface of the device 110 to provide users an indication that the device 110 is slowing or stopping.

The device 110 may include a modular payload bay. In some embodiments, the modular payload bay is located within the lower structure. The modular payload bay may provide mechanical and/or electrical connectivity with the device 110. For example, the modular payload bay may include one or more engagement features such as slots, cams, ridges, magnets, bolts, and so forth that are used to mechanically secure an accessory within the modular payload bay. In some embodiments, the modular payload bay includes walls within which the accessory may sit. In other embodiments, the modular payload bay may include other mechanical engagement features such as slots into which the accessory may be slid and engage. The device 110 may further include a mast, which may include a light. The mast 256 may extend and retract vertically with respect to the device 110. The light may activate (e.g., emit light) to indicate activity of the device 110, such as processing audio data in response to detection of a wakeword.

As explained herein, the device 110 may include only a single microphone. In other embodiments, the device 110 includes more than one microphone, and the device 110 may process audio data received from one of the more than one microphones. In still other embodiments, the device 110 receives audio data from more than one microphone; this audio data may be, for example, an average of audio data received from the more than one microphones.

In some embodiments, the microphone array 210 includes eight microphones, arranged in two concentric circles; the four microphones of one circle may be rotated 45 degrees with respect to the four microphones of the other circle. The present disclosure is not, however, limited to any particular number or arrangement of microphones.

The microphone array 210 may include various numbers of individual microphones. The individual microphones may capture sound and pass the resulting audio signals created by the sound to downstream components, such as a directional power magnitude component, as discussed below. Each individual piece of audio data captured by a microphone may be represented as a time-domain audio signal; these signals may be converted to the frequency domain using an analysis filterbank, which may perform a Fourier transform.

To isolate audio from a particular direction, as discussed herein, the device 110 may compare the audio data (or audio signals related to the audio data, such as audio signals in a sub-band domain) to determine a time difference of detection of a particular segment of audio data. If the audio data for a first microphone includes the segment of audio data earlier in time than the audio data for a second microphone, then the device 110 may determine that the source of the audio that resulted in the segment of audio data may be located closer to the first microphone than to the second microphone (which resulted in the audio being detected by the first microphone before being detected by the second microphone).

Figure 3:
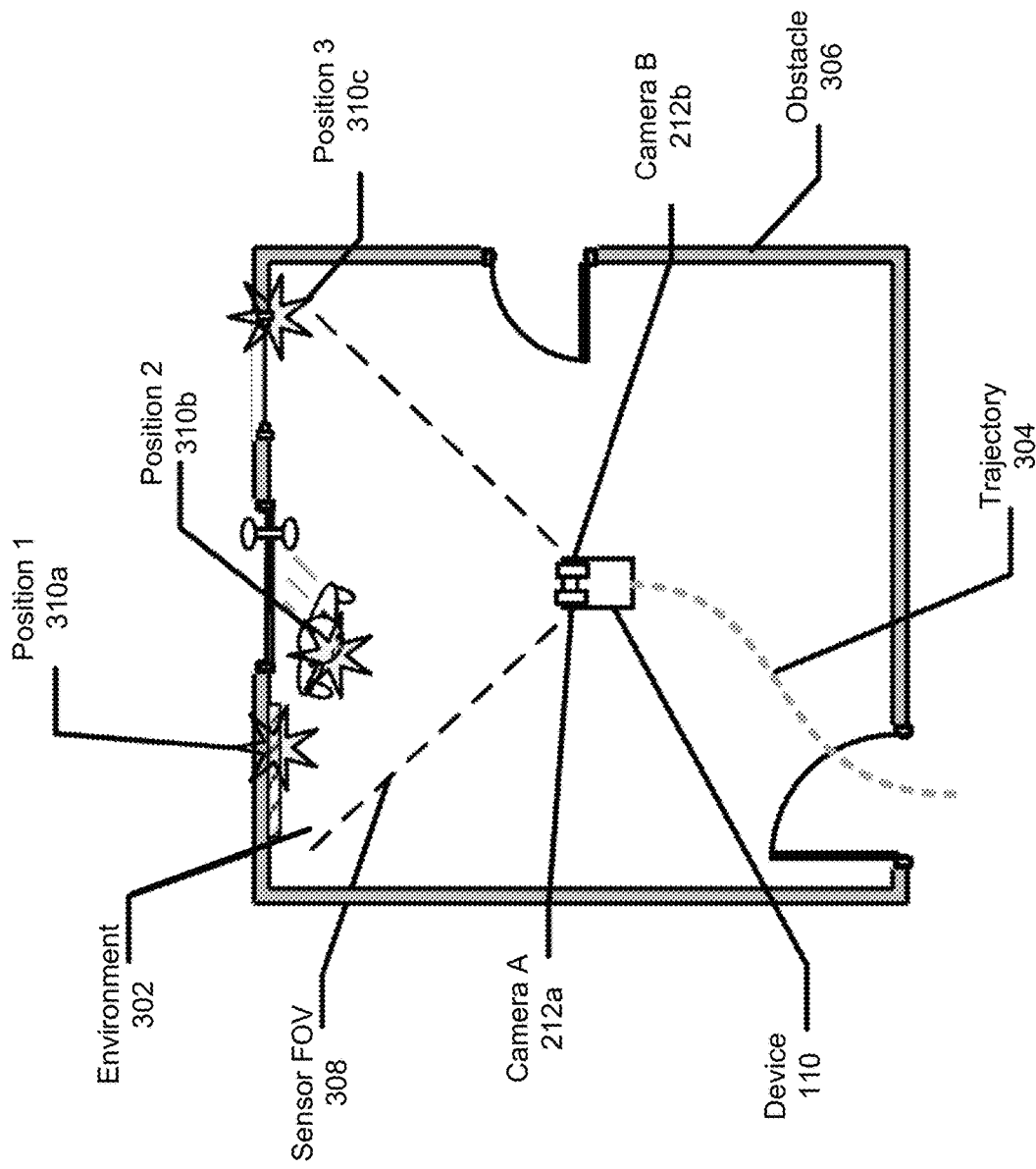
FIG. 3 illustrates an environment of an autonomously motile device according to embodiments of the present disclosure.

As shown in FIG. 3, the autonomously motile device 110 may move in the environment 302. The motion of the autonomously motile device 110 may be described as a trajectory 304. In some implementations, the trajectory 304 may comprise a series of poses. Each pose may be indicative of a particular location with respect to a plurality of orthogonal axes and rotation with respect to individual ones of the axes. For example, the pose may comprise information with respect to six degrees of freedom indicative of coordinates in three-dimensional space with respect to a designated origin and rotation with respect to each of the three axes.

One or more motors or other actuators enable the autonomously motile device 110 to move from one location in the environment 302 to another. For example, a motor may be used to drive a wheel attached to a chassis of the autonomously motile device 110, which causes the autonomously motile device 110 to move. The autonomously motile device 110 may turn, move forward, move backward, and so forth. In another example, actuators may move legs allowing the autonomously motile device 110 to walk.

Figure 11A:
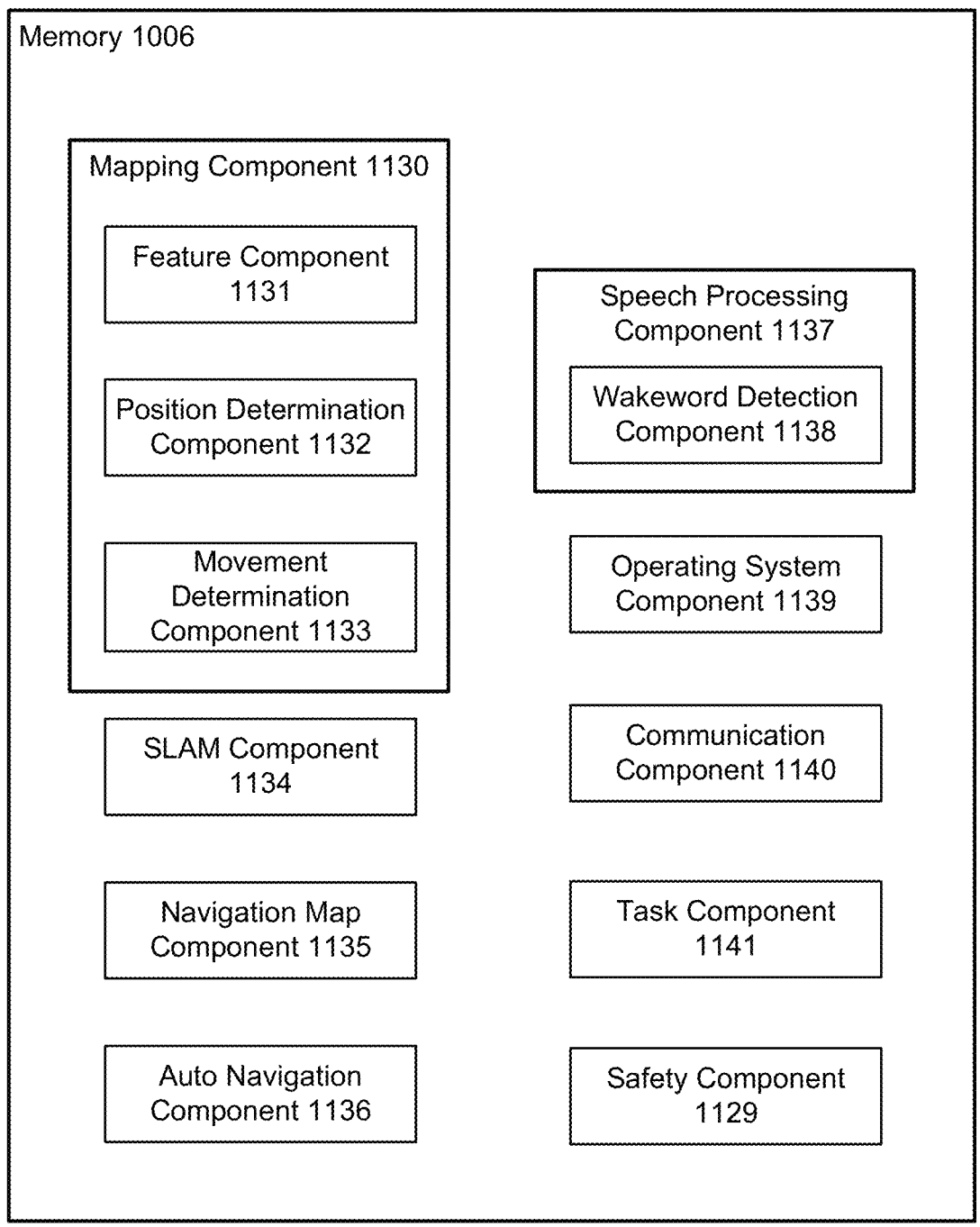
FIG. 11A illustrates components that may be stored in a memory of an autonomously motile device according to embodiments of the present disclosure.
Figure 11B:
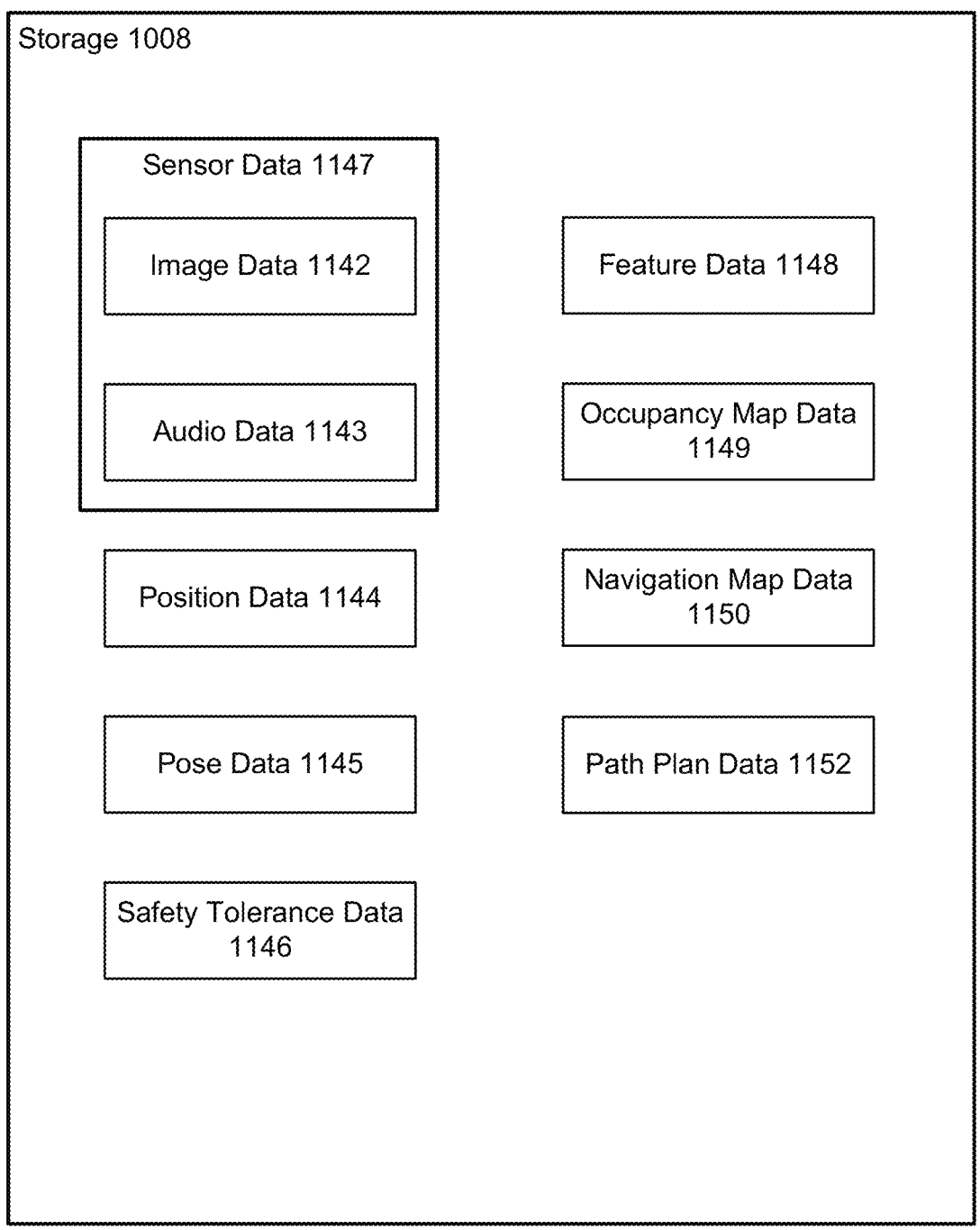
FIG. 11B illustrates data that may be stored in a memory of an autonomously motile device according to embodiments of the present disclosure.
Figure 11C:
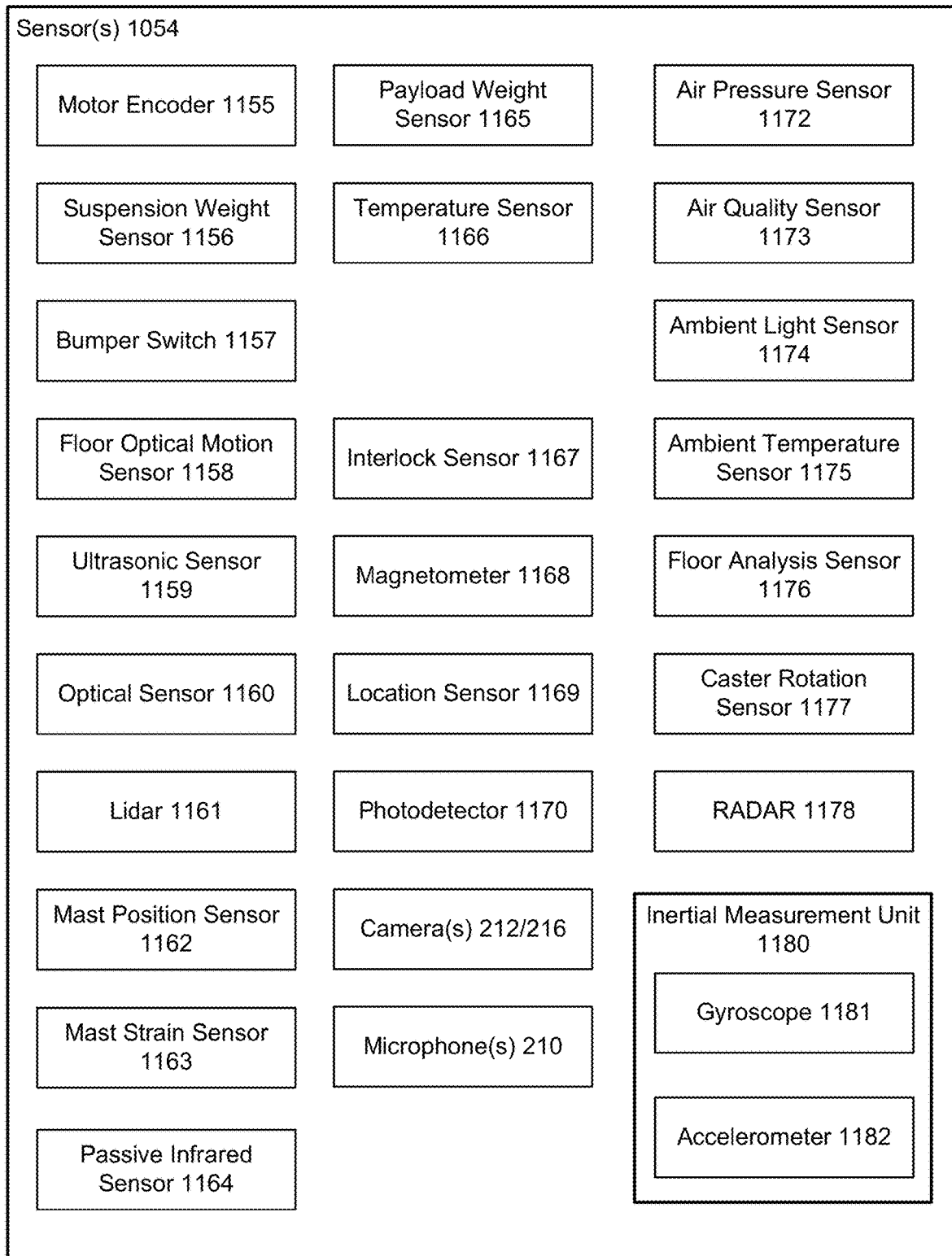
FIG. 11C illustrates sensors that may be included as part of an autonomously motile device according to embodiments of the present disclosure.

The autonomously motile device 110 may include one or more sensors 1054 (as shown in FIG. 11C). For example, the sensors 1054 may include a first camera 212*a*, a second camera 212*b*, an inertial measurement unit (IMU) 1180, microphones, time-of-flight sensors, and so forth. The first camera 212*a* and the second camera 212*b* may be mounted to a common rigid structure that maintains a relative distance between the cameras 212. An IMU 1180 may be attached to this common rigid structure, or one of the cameras affixed thereto. The first camera 212*a* and the second camera 212*b* may be arranged such that a sensor field-of-view 308 of the first camera 212*a* overlaps at least in part a sensor field-of-view 308 of the second camera 212*b*. The sensors 1054 may generate sensor data 1147 (which may be stored in storage 1008 as illustrated in FIG. 11B discussed below). The sensor data 1147 may include image data 1142 acquired by the first camera 212*a* and the second camera 212*b*. For example, a pair of images may comprise image data 1142 from the first camera 212*a* and the second camera 212*b* and may be acquired at the same time. For example, a first pair of images are acquired at time $t_1$ and a second pair of images are acquired at time $t_2$. The sensors 1054 are discussed in more detail with regard to FIG. 11C.

During its operation, the autonomously motile device 110 may determine input data. The input data may include or be based at least in part on sensor data 1147 from the sensors 1054 onboard the autonomously motile device 110. In one implementation, a speech processing component 1137 may process raw audio data obtained by a microphone on the autonomously motile device 110 and produce input data. For example, the user may say "robot, come here" which may produce input data "come here". In another implementation, the input data may comprise information such as a command provided by another computing device, such as a smartphone or tablet computer.

A mapping component 1130 (which may be included in memory 1006 as illustrated in FIG. 10 and as further discussed below) determines a representation of the environment 302 that includes the obstacles 306 and their location in the environment 302. During operation the mapping component 1130 uses the sensor data 1147 from various sensors 1054 to determine information such as where the autonomously motile device 110 is, how far the autonomously motile device 110 has moved, the presence of obstacles 306, where those obstacles 306 are, and so forth.

A feature component 1131 processes at least a portion of the image data 1142 to determine first feature data 1148. The first feature data 1148 is indicative of one or more features that are depicted in the image data 1142. For example, the features may be edges of doors, shadows on the wall, texture on the walls, portions of artwork in the environment 302, and so forth. The environment 302 may include display devices that are capable of changing the images they portray. For example, a television may be presented in the environment 302. The picture presented by the television may also have features.

Various techniques may be used to determine the presence of features in image data 1142. For example, one or more of a Canny detector, Sobel detector, difference of Gaussians, features from accelerated segment test (FAST) detector, scale-invariant feature transform (SIFT), speeded up robust features (SURF), trained convolutional neural network, or other detection methodologies may be used to determine features in the image data 1142. A feature that has been detected may have an associated descriptor that characterizes that feature. The descriptor may comprise a vector value in some implementations. For example, the descriptor may comprise data indicative of the feature with respect to 256 different dimensions.

The first feature data 1148 may comprise information such the descriptor for the feature, the images that the feature was detected in, location in the image data 1142 of the feature, and so forth. For example, the first feature data 1148 may indicate that in a first image the feature is centered at row 994, column 312 in the first image. These data and operations, along with those discussed below, may be used by the autonomously motile device 110, and/or other devices, to perform the operations described herein.

FIG. 4 illustrates a command-processing component 400 in accordance with the present disclosure. As explained above, the command-processing component 400 may receive first input data 402, which may be text data, audio data, image data, and/or other data representing a command. The command-processing component 400 may determine whether the first input data 402 corresponds to a known command, to a known command template, or to an unknown command and process the input text data 402 accordingly, as described below.

A command-determination component 404 (described in greater detail with reference to FIG. 5A) processes the first input data 402. The command-determination component 404 may determine that the first input data 402 represents a known command. The command-determination component 404 may, for example, include data representing a list of known commands and may determine that the first input data 402 corresponds to an item on the list. For example, the device 110 may include a mapping component 1130 (as illustrated in FIG. 11A) that is capable of determining a position of the device 110 in an environment and a navigation map component 1135 that is capable of identifying locations in the environment. If, therefore, the command is "go to the kitchen," the mapping component 1130 and/or navigation map component 1135 may cause the device 110 to move in the environment accordingly without further input from the user 102. The command-determination component 404 may determine corresponding response data A 134a, which may include instructions that cause the device 110 to respond to the command and/or data to be input to other components (such as the mapping component 1130 and/or navigation map component 1135) to cause the device to respond to the command.

In other embodiments, the command-determination component 404 may determine that the first input data 402 includes a representation of an unknown command. The command-determination component 404 may, for example, determine that the command represented in the first input data 402 is absent from a set of known commands and a set of known command templates. In these embodiments, the command-determination component 404 may cause a dialog component 410 to initiate a dialog with the user 102 to attempt to define the unknown command as a set of one or more known commands.

In some embodiments, prior to determining to cause the dialog component 410 to initiate the dialog, the command-determination component 404 may determine that the device 110 is incapable of responding to the command represented in the first input data 402. The command may, for example, specify that the device 110 move to an unreachable destination (e.g., "take this cup to the Moon") or perform a task that requires an ability not available to the device 110 (e.g., "Pick the cup up and take it to the kitchen."). In these embodiments, the command-determination component 404 may cause notification of the inability to be output to the user 102.

In some embodiments, prior to determining to cause the dialog component 410 to initiate the dialog, the command-determination component 404 may determine that the device 110 may not be capable of responding to the command represented in the first input data 402. For example, changes in the environment of the device 110 may allow performance of the command at some times but not at other times. Such changes may include the presence or absence of people in the environment and/or opening and closing of doors in the environment. For example, the command "Take this cup to Mom" may be possible to be performed when "Mom" is present in the environment but not possible when "Mom" is not present. In these embodiments, the command-determination component 404 may cause output to the user corresponding to the variability of the performance. If performance of the command is currently possible, the device 110 may perform the command; if the user 102 invokes the command in the future when performance of the command is not possible, the device 110 may then cause output to the user corresponding to the impossibility of performance.

Figure 5A:
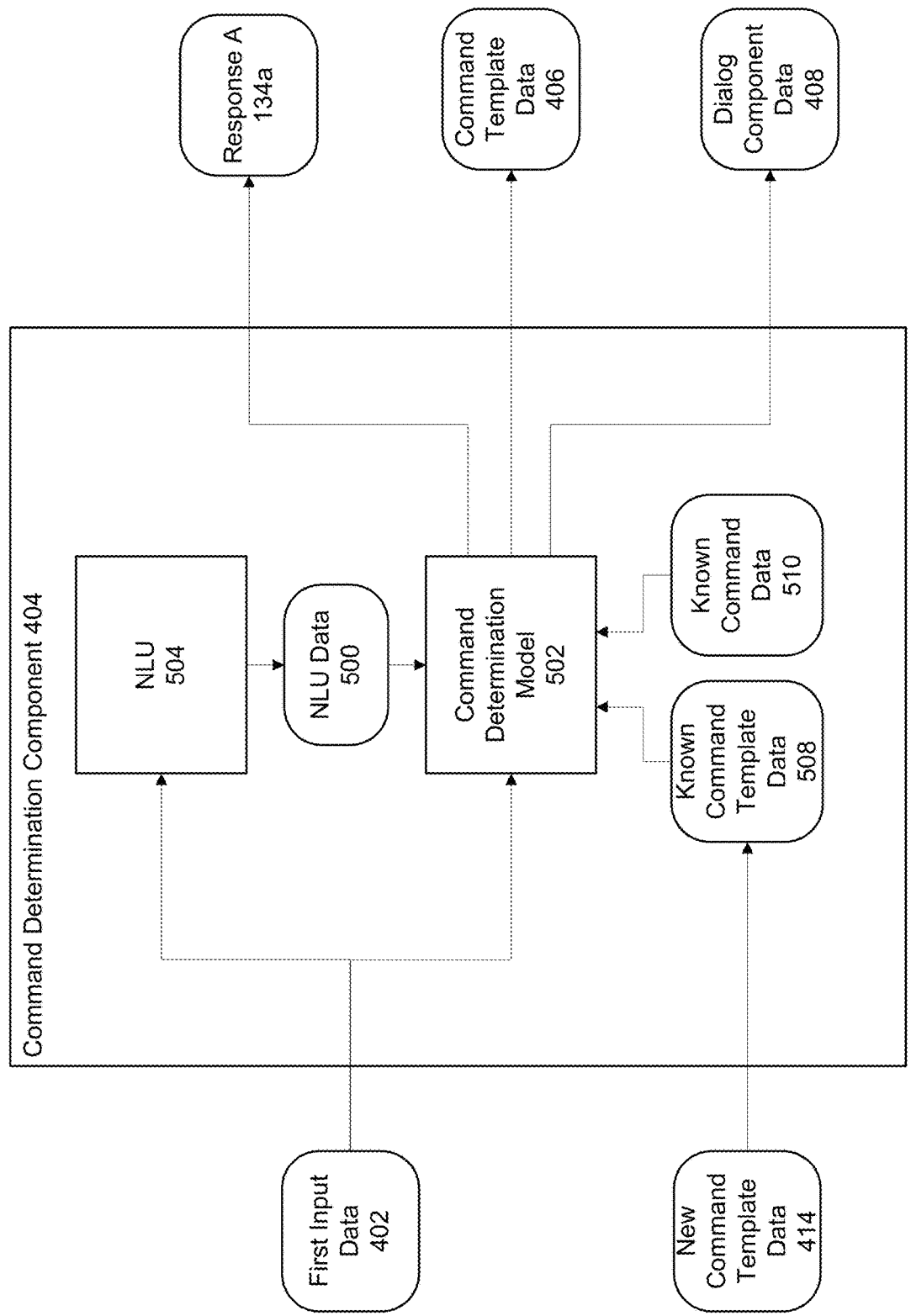
Figure 5B:
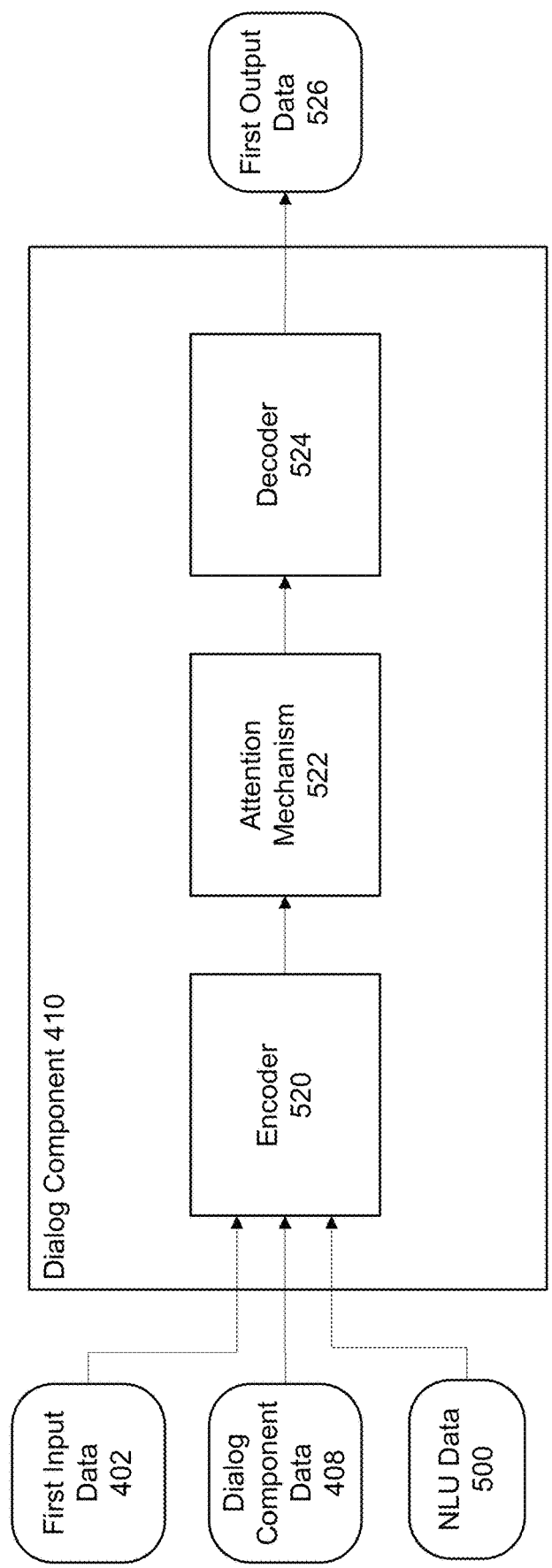

The dialog component 410, as shown in greater detail with reference to FIG. 5B, may be a neural-network sequence-to-sequence model that processes input data from the user 102 and determines output data to be output to the user 102. The dialog with the user 102 may include a single prompt output to the user and a single response to the prompt from the user 102 ("single-turn" dialog) or multiple prompts and responses ("multi-turn" dialog). The dialog component 410 may continue the dialog with the user 102 until it has determined that the unknown command may be performed using a set of one or more known commands.

For example, if the first input data 402 represents the command "Take this cup to the kitchen," the command-determination component 404 may determine that this command is an unknown command (e.g., the device 110 does not know how to respond to the command). The dialog component 410 may (for example) determine output audio representing the prompt, "How shall I do that?" In response, over one or more turns of dialog, the user 102 may specify that this command corresponds to a set of known commands such as "Come to me," "Wait for my prompt," "Go to the kitchen," and "Beep twice." Once the dialog manager 410 determines the set of known commands, it may determine corresponding response data 134c that represent the commands, which the device 110 may then carry out.

Like the command-determination component 404, the dialog component 410 may determine that the device 110 is incapable or responding to the command and/or is capable of responding to the command under certain environmental conditions but not others. For example, if the first input data 402 corresponds to "Take this cup to the kitchen," but then further input from the user 102 during the dialog includes the command "Pick the cup up from the table," the dialog component 410 may determine that the device is incapable of so doing. The dialog component 410 may cause output indicating the incapability and/or cause output indicating a similar command that it is capable of.

A command-template determination component 412 may process the response C 134c, the first input data 402, and/or other data to determine new command template data 414 corresponding to the first input data 402. The new command template data 414 may include, for each specific entity and/or action represented in the first input data 402, a general category of the entity and/or action. For example, the command-template determination component 412 may determine that entities such as "Kitchen," "Living Room," "corner," and/or "hallway" each correspond to a "[LOCATION]" category. Similarly, the command-template determination component 412 may determine that entities such as "cup" or "remote control" each correspond to an "[OBJECT]" category. The command-template determination component 412 may further determine that actions such as "deliver" or "take" correspond to a "[TRANSPORT OBJECT]" category.

In other words, the command-template determination component 412 may determine that similar commands such as "Deliver this cup to the kitchen" and "Take the remote control to the living room" correspond to a same command template, such as "[TRANSPORT OBJECT][OBJECT][LOCATION]." The command-template determination component 412 may thus determine the command template for one command and associate it with the set of known commands as determined by the dialog component 410. If and when the command-determination component 404 determines that addition input data 402 corresponds to a known template, it may send corresponding command template data 406 to a command template application component 408. The command template application component 408 may process the input data 402 to determine which entities therein correspond to which categories in the command template; for example, if the input data 402 includes a representation of the phrase "living room," the command template application component 408 may replace "[LOCATION]" in the command template with the entity "living room." Any commands in the set of known commands associated with the command template may be similarly replaced (e.g., "Go to living room").

A particular command or command portion may be associated with one or more mechanical operations of the device 110. For example, a command of "Deliver this cup to the kitchen" may be associated with a first portion corresponding to obtaining the cup and a second portion corresponding to transportation of the cup to a location known as "the kitchen." (The command may also be associated with other portions such as identifying an object called "cup" in image data, etc.) The portion corresponding to obtaining the cup may be associated with a series of mechanical operations performable by the device. For example, if the device is equipped with a tray attached to its chassis, the mechanical operations may involve the device operating its motors and wheels to position itself near a user and then hold itself stationary for sufficient time for the user to place the cup on the tray. In another example, if the device is equipped with a grasping mechanism, the mechanical operations may involve the device operating its motors and wheels to position itself near a user and operate the grasping mechanism to grasp the cup. The portion corresponding to delivering the cup to the kitchen may also be associated with its own series of mechanical operations performable by the device. For example, the device may use position data to determine that to move to the kitchen it needs to operate its motors and wheels to move 5 feet forward, turn left, move forward another 5 feet, turn left again and move another 5 feet.

As can be appreciated, certain of these command portions may involve similar (if not exactly the same) mechanical operations across different commands to the same device. For example, a command of "go to the kitchen" may involve the same mechanical operations as the second portion of "deliver this cup to the kitchen," assuming the device is in the same position. But the precise mechanical operations may be different when the device is in a different location relative to the kitchen. Further, for a different device, such as one associated with a different user profile and/or in a different environment, the mechanical operations may differ, even for the same command. As an example, "go to the kitchen" may result in different mechanical operations for a first device associated with a first user profile associated with a first home than for a second device associated with a second user profile associated with a second home. As a further example, "go to the kitchen" may result in different mechanical operations for a first device associated with a first user profile even during different times as a first path to the kitchen at one time may be blocked, resulting in the device taking different paths to the same kitchen at different times. As can be appreciated, the system can be configured to handle many such examples of the same command resulting in different mechanical operations depending on user profile, environment, environment conditions, object, or various other conditions.

Command portions may be associated with categories and/or templates that may allow the device to learn new commands from one user that may be adapted to being performed by a second user. For example, a user may teach a device to perform a first command such as "take this cup to my room." The system may associate the first portion of the command ("take my cup") with a first category associated with obtaining an object. The system may associate the second portion of the command ("to my room") with a second category associated with movement of the device. The system may store data with a first user profile of a user associating the first command with first mechanical operation(s) needed to perform the first portion and second mechanical operation(s) needed to perform the second portion for that specific user profile. The system may, however, determine how to perform the same command for a second user based on the category information. For example, the system may determine that the first portion of obtaining an object would involve similar mechanical operations for a first user and a second user. But the system may determine that the second portion of movement to "my room" would be different between the first user and the second user. Based on the category of the second portion of the command (e.g., movement), the system may determine a third mechanical operation(s) to perform the second portion for the second user. The system may then store an association of the first command with the first mechanical operation(s) and the third mechanical operation(s) with a second user profile for the second user, thus enabling the system to understand how to execute the first command differently for the second user than for the first user, even without the second user necessarily teaching the first command to a device associated with the second user profile.

FIG. 5A illustrates further details of the command determination component 404. A command determination model 502, which may be a trained neural-network model, processes the first input data 402 to determine one of the response A 134a (if the input data 402 represents a known command represented by known command data 510), corresponding command template data 406 (if the input data 402 corresponds to a known template) or dialog component data (if the command is an unknown command and is absent from known command template data 508).

The command determination model 502 may, in addition to determining the command template data 406, determine a confidence score representing a likelihood that the first input data 402 corresponds to the command template data 406. A high confidence score may indicate that the likelihood is high, while a low confidence score may indicate that the likelihood is low. If the confidence score satisfies a condition (e.g., is less than a threshold), the command determination model 502 may output a request for confirmation (using, e.g., the dialog component 410) and await for the confirmation before proceeding.

The command determination model 502 may thus include one or more neural-network nodes arranged in one or more layers. The nodes and layers may be arranged as feed-forward nodes or layers, such as convolutional neural-network (CNN) nodes or layers and/or as recurrent nodes or layers (such as long short-term memory (LSTM) or gated recurrent unit (GRU) nodes or layers). The command determination model 502 may be trained using training data that includes input data representing commands and target data representing whether the commands are known commands, correspond to a template, or are unknown commands. The training may include evaluation of the performance of the command determination model 502 by comparing an output of the model with the target data in accordance with a loss function and back-propagation of data into the command determination model 502 using a gradient descent algorithm.

Figure 7:
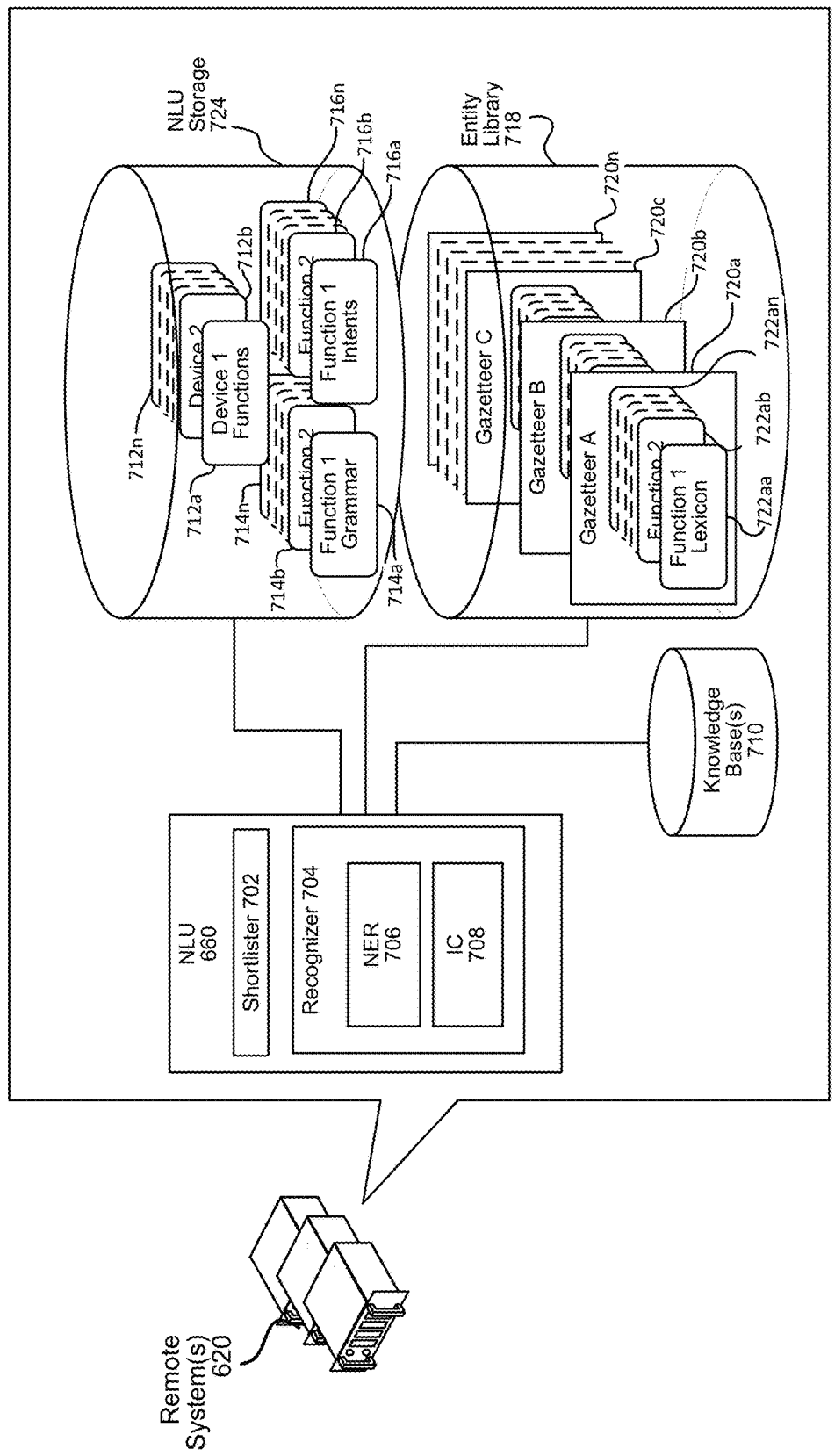
FIGS. 7 and 8 illustrate systems for natural-language processing according to embodiments of the present disclosure.
Figure 8:
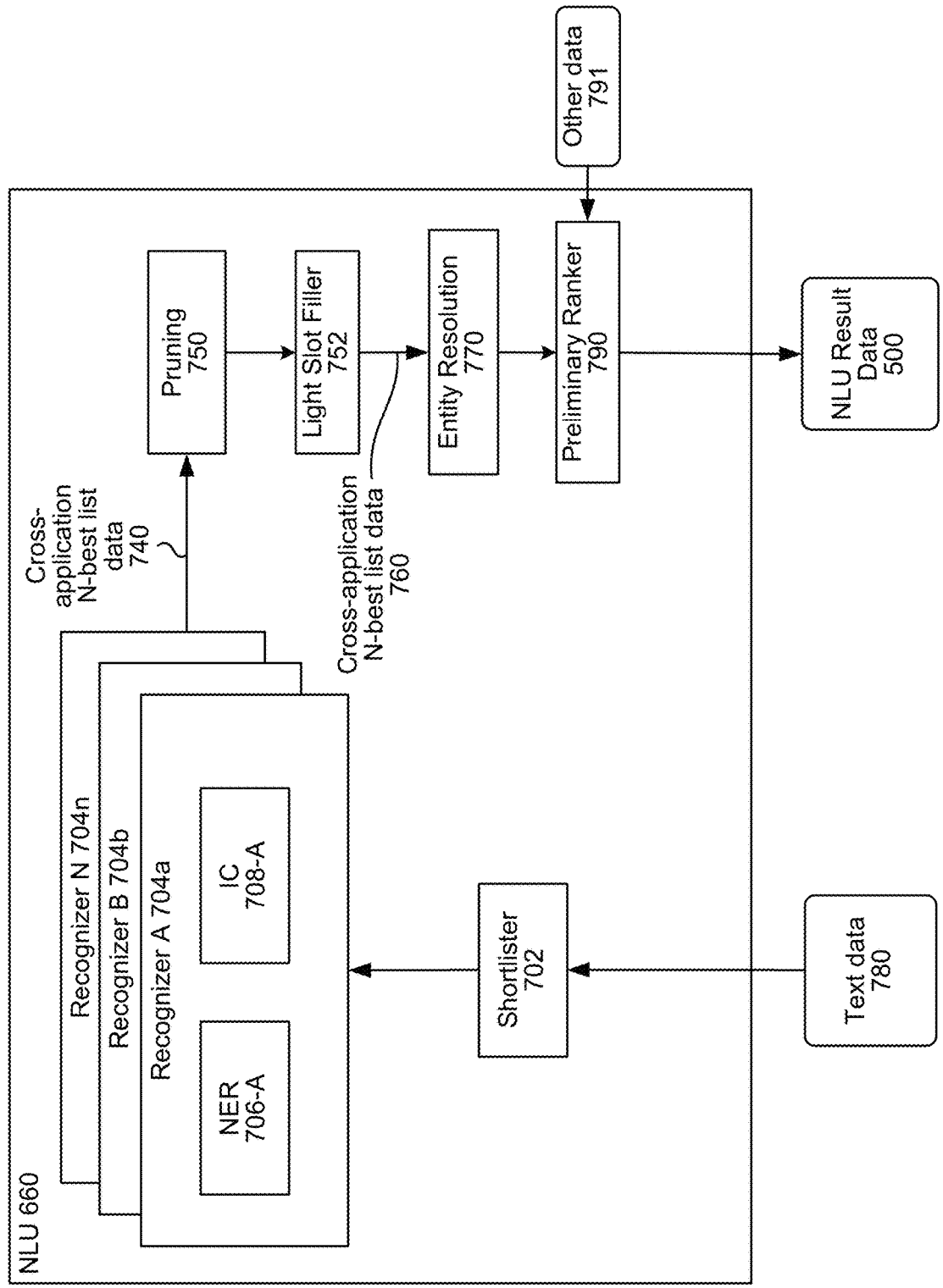

The command determination component 404 may further include an NLU component 504 (examples of which are shown in FIGS. 7 and 8). The NLU component 504 may process the input data 402 to determine NLU data 506, which may in turn also be processed by the command determination model 502. The NLU data 506 may include further information regarding entities named in the input text data. For example, a recognizer 704 may determine that a particular person corresponds to a name or nickname represented in the input data 402. The recognizer 704 may, for example, determine that the name "Mom" represented in the input data 402 corresponds to a particular user in the environment.

The command determination model 502 may further determine a risk value associated with performance of the command. The device 110 may be capable of executing a given command, but said performance may carry a risk of damage to the device 110. Execution of the command may, for example, involve the device 110 incurring a risk of falling (such as down a staircase), a risk of being too close to a heat source (such as a heater or fireplace) and/or a risk of being too close to machinery. If the risk value satisfies a condition (e.g., is greater than a threshold), the command determination model 502 may cause output (using, e.g., the dialog component 410) of a request for confirmation and may proceed only if the confirmation is received. For example, the system may determine that a mechanical operation to be performed in response to a command is potentially associated with damage to the device upon execution of the first input command. The system (through the components of the device discussed in FIGS. 11A-11C or otherwise) may receive third input data corresponding to a potential risk of damage to the device. The third input data my include image data showing a potential path of the device to a destination, data regarding the weight of a parcel a user has requested the device to carry, etc. Before the device executes the first command, it may process the third input data to determine the device is unlikely to be damaged upon execution of the first input command (for example the risk value being under a threshold or otherwise satisfying a condition).

FIG. 5B illustrates an embodiment of the dialog component 410. As illustrated, the dialog component 410 is a sequence-to-sequence ("seq2seq") model that includes an encoder 520, an attention mechanism 522, and a decoder 524, but the present disclosure is not limited to any time of dialog component. The encoder 520 and decoder 524 may be trained neural-network models comprising one or more nodes arranged in one or more layers; as described above, the nodes and/or layers may be CNN, LSTM, and/or GRU nodes and/or layers. The attention mechanism 522 may apply one or more weights to one or more outputs of the encoder 520 to place more emphasis ("attend to") on some outputs of the encoder 520 than others. The dialog component 410 may be trained using training data consisting of exemplary dialog sessions comprising a request to execute an unknown command and prompts and answers to define the unknown command as a set of known commands.

The encoder 520 may process the first input data 402 and encode it into an N-dimension vector, or "feature vector," that represents the utterance of the input data 402. The attention mechanism 522 may process the N-dimensional vector and/or other outputs of the encoder 520 to determine an attended N-dimensional vector. The decoder 524 may then process the attended N-dimensional vector to determine the first output data 526. The dialog component 410 may be trained in an "end-to-end" fashion, such that the output of the decoder 524 is compared to target training data, and then the encoder 520, attention mechanism 522, and/or decoder 524 are updated (in accordance with a loss function and gradient descent algorithm) accordingly.

Although FIG. 5B illustrates a single turn of dialog, any number of turns of dialog are within the scope of the present disclosure. Referring to FIG. 5C, for example, the dialog component 410 may process N turns of dialog, wherein N is any integer. The dialog component 410 may receive first input data 402a and determine first output data 526a (which may be output by the device 110 and/or other device). The dialog component 410 may then receive second input data 402b, which may be responsive to the first output data 526a and similarly determine second output data 526a, which may similarly be output by the device 110 and/or other device.

The dialog component 410 may process any number of additional turns of dialog before receiving Nth input data 402a and determining Nth output data 526n.

For example, the first input data 402a may represent the utterance "Deliver this cup to the kitchen." The dialog component 410 may determine that the first output data 526a includes a representation of the phrase(s) "How do I do that" or "What is the first step I should perform to do that?". The second input data 402b may thus represent the utterance, "First, come to me, then wait for my signal." The second output data 526b may then represent the phrase, "OK, what is the next step?". The Nth input data 402n may represent an utterance representing completion of the dialog, such as "OK, that's it," and the Nth output data 526n may represent a confirmation of the completion, such as "OK, got it."

As mentioned above, during the dialog, the dialog component 410 may determine that the device 110 is incapable of responding to the command (if, for example, a turn of dialog from the user 102 corresponds to a command that the device 110 is incapable of performing). In these embodiments, the first output data 526a may represent a phrase indicating this incapability such as, for example, "Sorry, I can't do that." If, however, the dialog component 410 determines that the initial unknown command corresponds to a set of one or more known commands, the dialog manager 410 may cause the device to perform that set of commands.

The input data 402 and/or the output data 526 may be data other than audio data (or text derived from audio data). The input data 402 may be text data received from a user device, such as the user device 110b illustrated in FIG. 6. Instead or in addition, the input data 402 may be image data (including images comprising video data). The user 102 may, for example, indicate one of the steps of executing the unknown command via a gesture or other motion. A gesture may include a user movement that is detectable by the device, 110, for example using camera(s) 212/216 or other sensors of the device. The device 110 may capture image data corresponding to the gesture and the device 110/system 120 may process the image data to determine the gesture. Example gestures may include, but are not limited to, a head nod, head shake, arm wave, arm circle, salute, etc. The user 102 may specify that the device 110 perform a motion (e.g., moving its display 214 up and down) by pantomiming the motion (e.g., head nodding). The device 110/system 120 may analyze the gesture and may determine which mechanical operation(s) the device 110 may perform in order to mimic the gesture. For example, the device 110 may mimic a head shake by raising the mast 256 and rotating the upper portion of the device (such as the portion including the display 214) along an axis. The user 102 may similarly specify that the device 110 select a particular route through the environment by moving along that route. The device 110 may capture the user's movement through image data and may replicate the path given the information available to the device 110/system 120 regarding the environment.

With reference to FIG. 5D, as discussed above, the command template determination component 412 may determine, for a new command represented in the first input data 402, new command template data 414. The command template determination component 412 may include a template determination model 530, which may be a trained neural network that is trained to associate specific entities with general categories such as associating the category "[LOCATION" with "kitchen" or "living room." The template determination model 530 may thus process the first input data 402 to determine the new command template data 414. The template determination model 530 may further associate the set of known commands that correspond to the new command (as determined by the dialog component 410 and as represented in the response C 134c) with the new command template data 414.

Figure 5E:
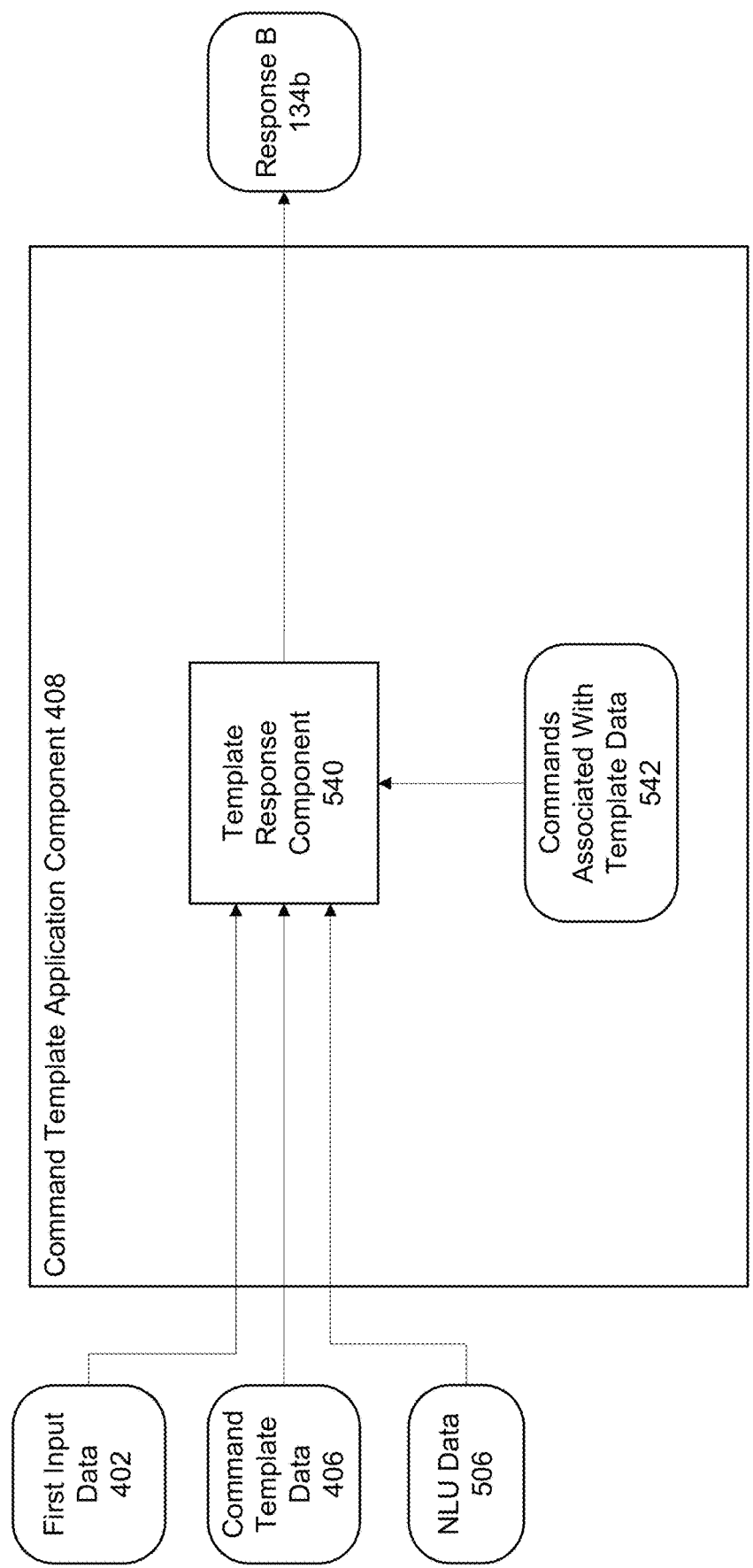

Referring to FIG. 5E, the command template application component 408 may apply command template data 406 (as determined by the command determination model 502) to the first input data 402 to determine the response B 134b. A template response component 540 may, as described above, determine that a category represented in the template data 406 corresponds to an entity in the first input data 402 and may then replace the category with the entity to determine the response B 134b. For example, the template response component 540 may replace the category "[LOCATION]" in the command template data 406 with the entity "kitchen" represented in the first input data 402. As described herein, the dialog component 410 may determine a set of one or more known commands for each unknown command; the template response component 540 may thus associate corresponding commands associated with the template data 542 with the response B 134b.

In some embodiments, a first user 102 may define first new commands (as described herein), and a second user 102 may define second new commands. These commands may be stored in the user profile corresponding to each user. A user-recognition component 695 (defined below with reference to FIGS. 6 and 9) may be used to distinguish between users. Commands defined by a first user may not be available for use by the second user, and vice versa. A user may, however, grant a second user permission to use some or all of that users commands by, for example, including an indication of that user in the user profile.

FIG. 6 illustrates various runtime components of the natural-language processing system 620. As shown in FIG. 6, certain components such as skill components 690 are disposed on the natural-language processing system 620. The present disclosure is not, however, limited to only this distribution of components, and some or all of the depicted components may be disposed on other systems 620 and/or on the user device 110 and/or other user devices 110, such as a voice-controlled device or hub device.

If the components are distributed between user device(s) 110 and/or system(s) 620, communication between various components may occur directly or across a network(s) 199. An audio capture component(s) of a user device A 110a, such as a microphone or array of microphones of the device 110a, captures utterance 104. The device 110a processes audio data, representing the utterance 104, to determine whether speech is detected. The device 110a may use various techniques to determine whether audio data includes speech. In some examples, the device 110a may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110a may implement a limited classifier configured to distinguish speech from background noise. The classifier may be implemented by techniques such as linear classifiers, support vector machines, and decision trees. In still other examples, the device 110a may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the utterance 104, the device 110a may use a wakeword-detection component 615 to perform wakeword detection to determine when a user intends to speak an input to the natural-language processing system 620. An example wakeword is "Alexa." Wakeword detection is typically performed without performing linguistic analysis, textual analysis, or semantic analysis. Instead, the audio data, representing the utterance 104, is analyzed to determine if specific characteristics of the audio data match preconfigured acoustic waveforms, audio signatures, or other data to determine if the audio data "matches" stored audio data corresponding to a wakeword.

Thus, the wakeword-detection component 615 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword-detection component 615 may be built on deep neural network (DNN)/recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the device 110a may "wake" and begin transmitting audio data 611, representing the utterance 104, to the natural-language processing system 620. The audio data 611 may include data corresponding to the wakeword, or the device 110a may remove the portion of the audio corresponding to the wakeword prior to sending the audio data 611 to the natural-language processing system 620.

An orchestrator component 630 may receive the audio data 611. The orchestrator component 630 may include memory and logic that enables the orchestrator component 630 to transmit various pieces and forms of data to various components of the system, as well as perform other operations.

The orchestrator component 630 may send the audio data 611 to an ASR component 650. The ASR component 650 transcribes the audio data 611 into text data. The text data output by the ASR component 650 represents one or more than one (e.g., in the form of an n-best list) ASR hypotheses representing speech represented in the audio data 611. The ASR component 650 interprets the speech in the audio data 611 based on a similarity between the audio data 611 and pre-established language models. For example, the ASR component 650 may compare the audio data 611 with models for sounds (e.g., subword units, such as phonemes, etc.) and sequences of sounds to identify words that match the sequence of sounds of the speech represented in the audio data 611. The ASR component 650 outputs text data representing one or more ASR hypotheses. The text data output by the ASR component 650 may include a top scoring ASR hypothesis or may include an n-best list of ASR hypotheses. Each ASR hypothesis may be associated with a respective score. Each score may indicate a confidence of ASR processing performed to generate the ASR hypothesis with which the score is associated.

Alternatively or in addition, a second user device B device 110b may receive a text-based user input. The device 110b may generate text data 613 representing the text-based user input. The device 110a may send the text data 613 to the natural-language processing system 620. The orchestrator component 630 may receive the text data 613. The orchestrator component 630 may send text data (e.g., text data output by the ASR component 650 or the received text data 613) to an NLU component 660.

The NLU component 660 (as described in greater detail with reference to FIGS. 7 and 8) attempts to make a semantic interpretation of the phrase(s) or statement(s) represented in the received text data. That is, the NLU component 660 determines one or more meanings associated with the phrase(s) or statement(s) represented in the text data based on words represented in the text data. The NLU component 660 determines an intent representing an action that a user desires be performed as well as pieces of the text data that allow a device (e.g., the device 110, the natural-language processing system 620, a skill 690, a skill system(s) 625, etc.) to execute the intent. For example, if the text data corresponds to "play Adele music," the NLU component 660 may determine an intent that the natural-language processing system 620 output music and may identify "Adele" as an artist. For further example, if the text data corresponds to "what is the weather," the NLU component 660 may determine an intent that the natural-language processing system 620 output weather information associated with a geographic location of the device 110. In another example, if the text data corresponds to "turn off the lights," the NLU component 660 may determine an intent that the natural-language processing system 620 turn off lights associated with the device(s) 110 or the user(s) 5. The NLU component 660 may output NLU results data (which may include tagged text data, indicators of intent, etc.).

As described above, the natural-language processing system 620 may perform speech processing using two different components (e.g., the ASR component 650 and the NLU component 660). One skilled in the art will appreciate that the natural-language processing system 620, in at least some implementations, may implement a spoken-language understanding (SLU) component that is configured to process audio data 611 to generate NLU results data. In such an implementation, the SLU component may implement the herein described NLU models.

In some examples, the SLU component may be equivalent to the ASR component 650 and the NLU component 660. For example, the SLU component may process audio data 611 and generate NLU data. The NLU data may include intent data and/or slot data so that directives may be determined based on the intent data and/or the slot data. While the SLU component may be equivalent to a combination of the ASR component 650 and the NLU component 660, the SLU component may process audio data 611 and directly generate the NLU data, without an intermediate step of generating text data (as does the ASR component 650). As such, the SLU component may take audio data 611 representing speech and attempt to make a semantic interpretation of the speech. That is, the SLU component may determine a meaning associated with the speech and then implement that meaning. For example, the SLU component may interpret audio data 611 representing speech from the user 5 in order to derive an intent or a desired action or operation from the user 5. In some examples, the SLU component outputs a most likely NLU response (e.g., hypothesis) recognized in the audio data 611, or multiple hypotheses in the form of a lattice or an N-best list with individual hypotheses corresponding to confidence scores or other scores (such as probability scores, etc.).

The natural-language processing system 620 may include one or more skills 690. A "skill" may be software running on the natural-language processing system 620 that is akin to a software application running on a traditional computing device. That is, a skill 690 may enable the natural-language processing system 620 to execute specific functionality in order to provide data or produce some other requested output. The natural-language processing system 620 may be configured with more than one skill 690. For example, a weather service skill may enable the natural-language processing system 620 to provide weather information, a car service skill may enable the natural-language processing system 620 to book a trip with respect to a taxi or ride sharing service, a restaurant skill may enable the natural-language processing system 620 to order a pizza with respect to the restaurant's online ordering system, etc. A skill 690 may operate in conjunction between the natural-language processing system 620 and other devices, such as the device 110, in order to complete certain functions. Inputs to a skill 690 may come from speech processing interactions or through other interactions or input sources. A skill 690 may include hardware, software, firmware, or the like that may be dedicated to a particular skill 690 or shared among different skills 690.

In addition or alternatively to being implemented by the natural-language processing system 620, a skill 690 may be implemented by a skill system(s) 625. Such may enable a skill system(s) 625 to execute specific functionality in order to provide data or perform some other action requested by a user. Skills may be associated with different domains, such as smart home, music, video, flash briefing, shopping, and custom (e.g., skills not associated with any preconfigured domain). The natural-language processing system 620 may be configured with a single skill 690 dedicated to interacting with more than one skill system(s) 625.

Unless expressly stated otherwise, reference herein to a "skill," or a derivative thereof, may include a skill 690 operated by the natural-language processing system 620 and/or skill operated by a skill system(s) 625. Moreover, the functionality described herein as a skill may be referred to using many different terms, such as an action, bot, app, or the like.

The natural-language processing system 620 may include a TTS component 680. The TTS component 680 may generate audio data (e.g., synthesized speech) from text data using one or more different methods. Text data input to the TTS component 680 may come from a skill 690, the orchestrator component 630, or another component of the natural-language processing system 620.

In one method of synthesis called unit selection, the TTS component 680 matches text data against a database of recorded speech. The TTS component 680 selects matching units of recorded speech and concatenates the units together to form audio data. In another method of synthesis called parametric synthesis, the TTS component 680 varies parameters such as frequency, volume, and noise to create audio data including an artificial speech waveform. Parametric synthesis uses a computerized voice generator, sometimes called a vocoder.

The natural-language processing system 620 may include a user-recognition component 695 that recognizes one or more users associated with data input to the natural-language processing system 620. The user-recognition component 695 may take as input the audio data 611 and/or the text data 613. The user-recognition component 695 may perform user recognition by comparing speech characteristics in the audio data 611 to stored speech characteristics of users. The user-recognition component 695 may additionally or alternatively perform user recognition by comparing biometric data (e.g., fingerprint data, iris data, etc.), received by the natural-language processing system 620 in correlation with a user input, to stored biometric data of users. The user-recognition component 695 may additionally or alternatively perform user recognition by comparing image data (e.g., including a representation of at least a feature of a user), received by the natural-language processing system 620 in correlation with a user input, with stored image data including representations of features of different users. The user-recognition component 695 may perform other or additional user recognition processes, including those known in the art. For a particular user input, the user-recognition component 695 may perform processing with respect to stored data of users associated with the device 110 that captured the user input.

The user-recognition component 695 may determine whether a user input originated from a particular user. For example, the user-recognition component 695 may generate a first value representing a likelihood that a user input originated from a first user, a second value representing a likelihood that the user input originated from a second user, etc. The user-recognition component 695 may also determine an overall confidence regarding the accuracy of user recognition operations.

The user-recognition component 695 may output a single user identifier corresponding to the most likely user that originated the user input. Alternatively, the user-recognition component 695 may output multiple user identifiers (e.g., in the form of an N-best list) with respective values representing likelihoods of respective users originating the user input. The output of the user-recognition component 695 may be used to inform NLU processing, processing performed by a skill 690, as well as processing performed by other components of the natural-language processing system 620 and/or other systems.

The natural-language processing system 620 may include profile storage 640. The profile storage 640 may include a variety of information related to individual users, groups of users, devices, etc. that interact with the natural-language processing system 620. A "profile" refers to a set of data associated with a user, group of users, device, etc. The data of a profile may include preferences specific to the user, group of users, device, etc.; input and output capabilities of one or more devices; internet connectivity information; user bibliographic information; subscription information; as well as other information.

The profile storage 640 may include one or more user profiles, with each user profile being associated with a different user identifier. Each user profile may include various user identifying information. Each user profile may also include preferences of the user and/or one or more device identifiers, representing one or more devices registered to the user. Each user profile may include identifiers of skills that the user has enabled. When a user enables a skill, the user is providing the natural-language processing system 620 with permission to allow the skill to execute with respect to the user's inputs. If a user does not enable a skill, the natural-language processing system 620 may not permit the skill to execute with respect to the user's inputs.

The profile storage 640 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile. A group profile may include one or more device profiles representing one or more devices associated with the group profile.

The profile storage 640 may include one or more device profiles. Each device profile may be associated with a different device identifier. Each device profile may include various device identifying information. Each device profile may also include one or more user identifiers, representing one or more user profiles associated with the device profile. For example, a household device's profile may include the user identifiers of users of the household.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

In various embodiments, the wakeword detection component 615 may detect a first wakeword represented in first audio data 611 and one or more other wakewords(s) represented in one or more other items of audio data 611. An example of a first wakeword is "Alexa," and an example of a second wakeword is "Hey Sam." A first wakeword may be associated with a first speech-processing system, which may include a first ASR component 650, a first NLU component 660, and/or a first TTS component 680; a second wakeword may be associated with a second speech-processing system, which may include a second ASR component 650, a second NLU component 660, and/or a second TTS component 680. The first speech-processing system may be associated with a first set of commands and corresponding outputs, and the second speech-processing system may be associated with a second set of commands and corresponding outputs. Some commands may be represented only in the first or second set of commands, while other commands may be common to both the first and second set of commands.

The device 110 may determine, as described herein, a response to a new command represented in first audio data associated with the first wakeword and may determine corresponding command template data 406. The device 110 may later receive second audio data associated with a second wakeword and determine that the second audio data corresponds to the command template data 406. The device may then execute a command represented in the second audio data using the command template data 406. In other words, the device 110 may determine a response to a first command associated with the first wakeword and then re-use the response when a second command associated with a second wakeword is received. In some embodiments, the device 110 may determine that a profile associated with the profile storage 640 grants permission to re-use the response.

FIGS. 7 and 8 illustrates how NLU processing may be performed on input text data derived from input audio data. Referring first to FIG. 7, the NLU component 660 (such as the one depicted in FIG. 6) determines a semantic interpretation of text represented in text data. That is, the NLU component 660 determines the meaning behind the text represented in text data based on the individual words. The NLU component 660 interprets the text to derive an intent or a desired action of the user as well as the pertinent pieces of information in the text (e.g., entities) that allow a device (e.g., the user device 110, system 620, skill(s) 690, and/or skill system(s) 625) to complete that action.

The NLU component 660 may process text data to determine several hypotheses of a domain, intent, and/or entity corresponding to a single utterance. For example, if the ASR component 650 outputs ASR results including an N-best list of hypotheses, the NLU component 660 may process the text data with respect to all (or a portion of) the textual interpretations represented therein. The NLU component 660 may annotate text represented in text data by parsing and/or tagging the text. For example, for the text "tell me the weather for Seattle," the NLU component 660 may tag "tell me the weather for Seattle" as a command (e.g., to output weather information) as well as tag "Seattle" as a location for the weather information.

The NLU component 660 may include a shortlister component 702. The shortlister component 702 selects applications that may execute with respect to text data 780 input to the NLU component (e.g., applications that may execute the command). The shortlister component 702 thus limits downstream, more resource intensive NLU processes to being performed with respect to applications that may execute the command.

Without a shortlister component 702, the NLU component 660 may process a given hypothesis with respect to every application of the system, either in parallel, in series, or using some combination thereof. By including a shortlister component 702, the NLU component 660 may process a given hypothesis with respect to only the applications that may execute the command. This reduces total compute power and latency attributed to NLU processing.

The NLU component 660 may include one or more recognizers 704*a-n*. Each recognizer 704 may be associated with a different function, content source, and/or speech-processing system. The NLU component 660 may determine a function potentially associated with the command represented in text data input thereto in order to determine the proper recognizer 704 to process the hypothesis. The NLU component 660 may determine a command represented in text data is potentially associated with more than one function. Multiple recognizers 704 may be functionally linked (e.g., a telephony/communications recognizer and a calendaring recognizer may utilize data from the same contact list).

If the shortlister component 702 determines text corresponding to a hypothesis is potentially associated with multiple skills 690 and/or multiple speech-processing systems, the recognizers 704 associated with the skills 690 and/or multiple speech-processing systems (e.g., the recognizers 704 associated with the applications in the subset selected by the shortlister 702) may process the text. The selected recognizers 704 may process the text in parallel, in series, partially in parallel, etc. For example, if text corresponding to a hypothesis potentially implicates both a communications speech-processing system and a music speech-processing system, a recognizer associated with the communications speech-processing system may process the text in parallel, or partially in parallel, with a recognizer associated with the music application processing the text. The output generated by each recognizer 704 may be scored, with the overall highest scored output from all recognizers 704 ordinarily being selected to be the correct result.

The NLU component 660 may communicate with various storages to determine the potential speech-processing system(s) associated with a command represented in text data. The NLU component 660 may communicate with an NLU storage 724, which includes databases of devices (712a-712n) identifying functions associated with specific devices. For example, the user device 110 may be associated with speech-processing systems for music, calendaring, contact lists, device-specific communications, etc. In addition, the NLU component 660 may communicate with an entity library 718, which includes database entries about specific services on a specific device, either indexed by device ID, user ID, or group user ID, or some other indicator.

Each recognizer 704 may include a named entity recognition (NER) component 706. The NER component 706 attempts to identify grammars and lexical information that may be used to construe meaning with respect to a command represented in text data input therein. The NER component 706 identifies portions of text represented in text data input into the NLU component 660 that correspond to a named entity that may be recognizable by the system. The NER component 706 (or other component of the NLU component 660) may also determine whether a word refers to an entity that is not explicitly mentioned in the utterance text, for example words such as "him," "her," or "it."

Each recognizer 704, and more specifically each NER component 706, may be associated with a particular grammar model 714, a particular set of intents 716, and a particular personalized lexicon 722. Each gazetteer 720 may include function-indexed lexical information associated with a particular user and/or device. For example, gazetteer A (720a) includes function-indexed lexicons 722aa to 722an. A user's music function lexical information might include album titles, artist names, and song names, for example, whereas a user's contact-list lexical information might include the names of contacts. Since every user's music collection and contact list is presumably different, this personalized information improves entity resolution.

An NER component 706 may apply grammar models 714 and/or lexicons 722 associated with the function (associated with the recognizer 704 implementing the NER component 706) to determine a mention one or more entities in text data input thereto. In this manner, the NER component 706 may identify "slots" (i.e., particular words in text data) that may be needed for later command processing. The NER component 706 may also label each slot with a type of varying levels of specificity (e.g., noun, place, city, artist name, song name, etc.).

Each grammar model 714 may include the names of entities (i.e., nouns) commonly found in text about the particular function to which the grammar model 714 relates, whereas the lexicon 722 is personalized to the user(s) and/or the user device 110 from which the input data or input text data originated. For example, a grammar model 714 associated with a shopping function may include a database of words commonly used when people discuss shopping.

A process called named entity resolution may link a portion of text to an entity known to the system. To perform this named entity resolution, the NLU component 660 may use gazetteer information (720a-720n) stored in an entity library storage 718. The gazetteer information 720 may be used to match text represented in text data with different entities, such as song titles, contact names, etc. Gazetteers may be linked to users (e.g., a particular gazetteer may be associated with a specific user's music collection), may be linked to certain function categories (e.g., shopping, music, video, communications, etc.), or may be organized in a variety of other ways.

Each recognizer 704 may also include an intent classification (IC) component 708. The IC component 708 parses text data to determine an intent(s) of the function associated with the recognizer 704 that potentially corresponds to the text data. An intent corresponds to an action to be performed that is responsive to the command represented by the text data. The IC component 708 may communicate with a database 716 of words linked to intents. For example, a music intent database may link words and phrases such as "quiet," "volume off," and "mute" to a "mute" intent. The IC component 708 identifies potential intents by comparing words in the text data to the words and phrases in an intents database 716 associated with the function that is associated with the recognizer 704 implementing the IC component 708.

The intents identifiable by a specific IC component 708 may be linked to function-specific (i.e., the function associated with the recognizer 704 implementing the IC component 708) grammar model 714 with "slots" to be filled. Each slot of a grammar model 714 may correspond to a portion of the text data that the system believes corresponds to an entity. For example, a grammar model 714 corresponding to a <PlayMusic> intent may correspond to text data sentence structures such as "Play {Artist Name}," "Play {Album Name}," "Play {Song name}," "Play {Song name} by {Artist Name}," etc. However, to make resolution more flexible, grammar models 714 may not be structured as sentences, but rather based on associating slots with grammatical tags.

For example, an NER component 706 may parse text data to identify words as subject, object, verb, preposition, etc. based on grammar rules and/or models prior to recognizing named entities in the text data. An IC component 708 (implemented by the same recognizer 704 as the NER component 706) may use the identified verb to identify an intent. The NER component 706 may then determine a grammar model 714 associated with the identified intent. For example, a grammar model 714 for an intent corresponding to <PlayMusic> may specify a list of slots applicable to play the identified object and any object modifier (e.g., a prepositional phrase), such as {Artist Name}, {Album Name}, {Song name}, etc. The NER component 706 may then search corresponding fields in a lexicon 722 associated with the function associated with the recognizer 704 implementing the NER component 706 and may match words and phrases in the text data the NER component 706 previously tagged as a grammatical object or object modifier with those identified in the lexicon 722.

The NER component 706 may perform semantic tagging, which refers to the labeling of a word or combination of words according to their type/semantic meaning. The NER component 706 may parse text data using heuristic grammar rules, or a model may be constructed using techniques such as hidden Markov models, maximum entropy models, log linear models, conditional random fields (CRF), and the like. For example, an NER component 706 implemented by a music function recognizer 704 may parse and tag text corresponding to "play mother's little helper by the rolling stones" as {Verb}: "Play," {Object}: "mother's little helper," {Object Preposition}: "by," and {Object Modifier}: "the rolling stones." The NER component 706 may identify "Play" as a verb based on a word database associated with the music function, which an IC component 708 (which may also implemented by the music function recognizer 704) may determine that the word corresponds to a <PlayMusic> intent. At this stage, no determination may have been made as to the meaning of "mother's little helper" and "the rolling stones," but based on grammar rules and models, the NER component 706 may have determined that the text of these phrases relates to the grammatical object (i.e., entity) of the text data.

The frameworks linked to the intent may then be used to determine what database fields may be searched to determine the meaning of these phrases, such as searching a user's gazetteer 720 for similarity with the framework slots. For example, a framework for a <PlayMusic> intent might indicate to attempt to resolve the identified object based {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer 720 does not resolve a slot/field using gazetteer information, the NER component 706 may search, in the knowledge base 710, the database of generic words associated with the function. For example, if the text data includes text corresponding to "play songs by the rolling stones," after failing to determine an album name or song name called "songs" by "the rolling stones," the NER component 706 may search the function's vocabulary for the word "songs." In the some embodiments, generic words may be checked before the gazetteer information, or both may be tried, potentially producing two different results.

The NLU component 660 may tag text to attribute meaning to the text. For example, the NLU component 660 may tag "play mother's little helper by the rolling stones" as {intent}: <PlayMusic>, {artist name}: rolling stones, {media type}: SONG, and {song title}: mother's little helper. In another example, the NLU component 660 may tag "play songs by the rolling stones" as {intent}: <PlayMusic>, {artist name}: rolling stones, and {media type}: SONG.

The shortlister component 702 may receive text data 780 output from the ASR component 650 (as illustrated in FIG. 6). The ASR component 650 may embed the text data 780 into a form processable by a trained model(s) using sentence-embedding techniques. Sentence embedding may include, in the text data 780, text in a structure that enables the trained models of the shortlister component 702 to operate on the text. For example, an embedding of the text data 780 may be a vector representation of the text data.

The shortlister component 702 may make binary determinations (e.g., yes/no determinations) regarding which skill(s) 690 relate to the text data 780. The shortlister component 702 may make such determinations using the one or more trained models described herein above. If the shortlister component 702 implements a single trained model for each skill 690, the shortlister component 702 may simply run the models that are associated with enabled applications as indicated in a profile associated with the user device 110 and/or user that originated the command.

The shortlister component 702 may generate N-best list data representing applications that may execute with respect to the command represented in the text data 780. The size of the N-best list represented in the N-best list data is configurable. In an example, the N-best list data may indicate every application of the system as well as contain an indication, for each application, regarding whether the application is likely capable to execute the command represented in the text data 780. In another example, instead of indicating every application of the system, the N-best list data may only indicate all of the applications that are likely to be able to execute the command represented in the text data 780. In yet another example, the shortlister component 702 may implement thresholding such that the N-best list data may indicate no more than a maximum number of applications that may execute the command represented in the text data 780. In an example, the threshold number of applications that may be represented in the N-best list data is ten (10). In another example, the applications included in the N-best list data may be limited by a threshold a score, where only applications indicating a likelihood to handle the command is above a certain score (as determined by processing the text data 780 by the shortlister component 702 relative to such applications).

The pruning component 750 creates a new, shorter N-best list (i.e., represented in new N-best list data 760 discussed below) based on the previous N-best list data 740. The pruning component 750 may sort the tagged text represented in the N-best list data 740 according to their respective scores.

The pruning component 750 may perform score thresholding with respect to the N-best list data 740. For example, the pruning component 750 may select entries represented in the N-best list data 740 associated with a score satisfying (e.g., meeting and/or exceeding) a score threshold. The pruning component 750 may also or alternatively perform number of entry thresholding. For example, the pruning component 750 may select the top scoring entry(ies) associated with each different category of function (e.g., music, shopping, communications, etc.) represented in the N-best list data 740, with the new N-best list data 760 including a total number of entries meeting or falling below a threshold number of entries. The purpose of the pruning component 750 is to create a new list of top scoring entries so that downstream, more resource intensive processes may only operate on the tagged text entries that most likely correspond to the command input to the system.

The NLU component 660 may also include a light slot filler component 752. The light slot filler component 752 can take text from slots represented in the tagged text entry or entries output by the pruning component 750 and alter it to make the text more easily processed by downstream components. The light slot filler component 752 may perform low latency operations that do not involve heavy operations such as reference to a knowledge base. The purpose of the light slot filler component 752 is to replace words with other words or values that may be more easily understood by downstream components. For example, if a tagged text entry includes the word "tomorrow," the light slot filler component 752 may replace the word "tomorrow" with an actual date for purposes of downstream processing. Similarly, the light slot filler component 752 may replace the word "CD" with "album" or the words "compact disc." The replaced words are then included in the N-best list data 760.

The NLU component 660 sends the N-best list data 760 to an entity resolution component 770. The entity resolution component 770 can apply rules or other instructions to standardize labels or tokens from previous stages into an intent/slot representation. The precise transformation may depend on the function (e.g., for a travel function, the entity resolution component 770 may transform a text mention of "Boston airport" to the standard BOS three-letter code referring to the airport). The entity resolution component 770 can refer to an authority source (e.g., a knowledge base) that is used to specifically identify the precise entity referred to in each slot of each tagged text entry represented in the N-best list data 760. Specific intent/slot combinations may also be tied to a particular source, which may then be used to resolve the text. In the example "play songs by the stones," the entity resolution component 770 may reference a personal music catalog, Amazon Music account, user profile (described herein), or the like. The entity resolution component 770 may output data including an altered N-best list that is based on the N-best list represented in the N-best list data 760, but also includes more detailed information (e.g., entity IDs) about the specific entities mentioned in the slots and/or more detailed slot data that can eventually be used by a function. The NLU component 660 may include multiple entity resolution components 770 and each entity resolution component 770 may be specific to one or more functions.

The entity resolution component 770 may not be successful in resolving every entity and filling every slot represented in the N-best list data 760. This may result in the entity resolution component 770 outputting incomplete results. The NLU component 660 may include a final ranker component 790, which may consider such errors when determining how to rank the tagged text entries for potential execution. For example, if a book function recognizer 704 outputs a tagged text entry including a <ReadBook> intent flag, but the entity resolution component 770 cannot find a book with a title matching the text of the item, the final ranker component 790 may re-score that particular tagged text entry to be given a lower score. The final ranker component 790 may also assign a particular confidence to each tagged text entry input therein. The confidence score of a particular tagged text entry may be affected by whether the tagged text entry has unfilled slots. For example, if a tagged text entry associated with a first function includes slots that are all filled/resolved, that tagged text entry may be associated with a higher confidence than another tagged text entry including at least some slots that are unfilled/unresolved.

The final ranker component 790 may apply re-scoring, biasing, or other techniques to obtain the most preferred tagged and resolved text entry. To do so, the final ranker component 790 may consider not only the data output by the entity resolution component 770, but may also consider other data 791. The other data 791 may include a variety of information. For example, the other data 791 may include function rating or popularity data. For example, if one function has a particularly high rating, the final ranker component 790 may increase the score of a tagged text entry or entries associated with or otherwise invoking that particular function. The other data 791 may also include information about functions that have been specifically enabled by the user. For example, the final ranker component 790 may assign higher scores to tagged text entries associated with or otherwise invoking enabled functions than tagged text entries associated with or otherwise invoking non-enabled functions. User history may also be considered, such as if the user regularly uses a particular function or does so at particular times of day. Date, time, location, weather, type of user device 110, user ID, context, and other information may also be considered. For example, the final ranker component 790 may consider when any particular functions are currently active (e.g., music being played, a game being played, etc.). Following final ranking, the NLU component 660 may output NLU output data 506 to the orchestrator component 630. The NLU output data 506 may include various entries, with each entry representing an NLU processing confidence score, an intent, slot data, and a potential skill or skill that may operating with respect to the respective entry's data.

Following preliminary ranking, the NLU component 660 may output NLU results data 506. The NLU component 660 may send the NLU results data 506 to the orchestrator component 630. The NLU results data 506 may include first NLU results data 506a including tagged text associated with a first speech-processing system, second NLU results data 506b including tagged text associated with a second speech-processing system, etc. The NLU results data 506 may include tagged text data corresponding to the top scoring tagged text entries as determined by the preliminary ranker component 790.

The data 506 output from the NLU component 660 may include an N-best list of NLU results, where each item in the N-best list may correspond to a particular recognizer 704 and corresponding skill 690. Thus, for example, first NLU results of the N-best list may be associated with a first skill 690a, second NLU results of the N-best list may be associated with a second skill 690b, third NLU results of the N-best list may be associated with a third skill 690c, etc. Moreover, the first NLU results may correspond to text tagged to attribute meaning that enables the first skill 690a to execute with respect to the first NLU results, the second NLU results may correspond to text tagged to attribute meaning that enables the second skill 690b to execute with respect to the second NLU results, the third NLU results may correspond to text tagged to attribute meaning that enables the third skill 690c to execute with respect to the third NLU results, etc. The data 506 may also include scores corresponding to each item in the N-best list. Alternatively, the NLU result data 506 output to a particular skill 690 may include NER and IC data output by the particular skill's recognizer 704 while the NLU result data 506 output to the orchestrator component 630 may include only a portion of the NLU result data 506, for example the scores corresponding to certain skills.

The system may be configured with thousands, tens of thousands, etc. skills 690. The orchestrator component 630 enables the system to better determine the best skill 690 to execute the command input to the system. For example, first NLU results may correspond or substantially correspond to second NLU results, even though the first NLU results are operated on by a first skill 690a and the second NLU results are operated on by a second skill 690b. The first NLU results may be associated with a first confidence score indicating the system's confidence with respect to NLU processing performed to generate the first NLU results. Moreover, the second NLU results may be associated with a second confidence score indicating the system's confidence with respect to NLU processing performed to generate the second NLU results. The first confidence score may be similar or identical to the second confidence score since the first NLU results correspond or substantially correspond to the second NLU results. The first confidence score and/or the second confidence score may be a numeric value (e.g., from 0.0 to 1.0). Alternatively, the first confidence score and/or the second confidence score may be a binned value (e.g., low, medium, high).

The orchestrator component 630 may solicit the first skill 690a and the second skill 690b to provide potential result data based on the first NLU results and the second NLU results, respectively. For example, the orchestrator component 630 may send the first NLU results to the first skill 690a along with a request for the first skill 690a to at least partially execute a command with respect to the first NLU results. The orchestrator component 630 may also send the second NLU results to the second skill 690b along with a request for the second skill 690b to at least partially execute a command with respect to the first NLU results. The orchestrator component 630 receives, from the first skill 690a, first result data generated from the first skill's execution with respect to the first NLU results. The orchestrator component 630 also receives, from the second skill 690b, second results data generated from the second skill's execution with respect to the second NLU results.

The result data may include various components. For example, the result data may include content (e.g., audio data, text data, and/or video data) to be output to a user. The result data may also include a unique identifier (ID) used by the remote system 620 and/or the skill server(s) 625 to locate the data to be output to a user. The result data may also include an instruction. For example, if the command corresponds to "turn on the light," the result data may include an instruction causing the system to turn on a light associated with a profile of the user device 110 and/or user.

A system that does not use the orchestrator component 630 as described above may instead select the highest scored preliminary ranked NLU results data 506 associated with a single skill. The system may send the NLU results data 506 to the skill 690 along with a request for output data. In some situations, the skill 690 may not be able to provide the system with output data. This results in the system indicating to the user that the command could not be processed even though another skill associated with lower ranked NLU results data 506 could have provided output data responsive to the command.

Figure 9:
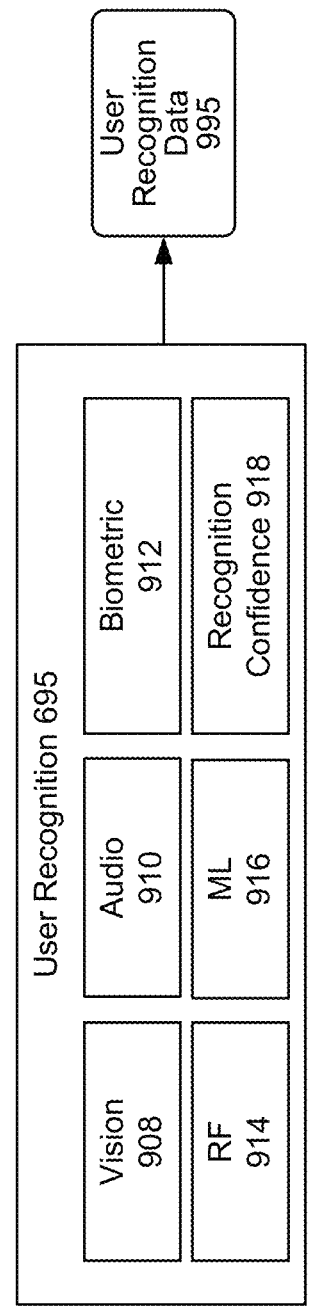
FIG. 9 illustrates a component configured for user recognition according to embodiments of the present disclosure.

As illustrated in FIG. 9, the user-recognition component 695 may include one or more subcomponents including a vision component 908, an audio component 910, a biometric component 912, a radio-frequency (RF) component 914, a machine-learning (ML) component 916, and a recognition confidence component 918. In some instances, the user-recognition component 695 may monitor data and determinations from one or more subcomponents to determine an identity of one or more users associated with data input to the system. The user-recognition component 695 may output user-recognition data 995, which may include a user identifier associated with a user the system believes is originating data input to the system. The user-recognition data 995 may be used to inform processes performed by the orchestrator 630 (or a subcomponent thereof) as described below.

The vision component 908 may receive data from one or more sensors capable of providing images (e.g., cameras) or sensors indicating motion (e.g., motion sensors). The vision component 908 can perform facial recognition or image analysis to determine an identity of a user and to associate that identity with a user profile associated with the user. In some instances, when a user is facing a camera, the vision component 908 may perform facial recognition and identify the user with a high degree of confidence. In other instances, the vision component 908 may have a low degree of confidence of an identity of a user, and the user-recognition component 695 may utilize determinations from additional components to determine an identity of a user. The vision component 908 can be used in conjunction with other components to determine an identity of a user. For example, the user-recognition component 695 may use data from the vision component 908 with data from the audio component 910 to identify what user's face appears to be speaking at the same time audio is captured by the user device 110 for purposes of identifying a user who spoke an input to the user device 110.

The user device 110 may include biometric sensors that transmit data to the biometric component 912. For example, the biometric component 912 may receive data corresponding to fingerprints, iris or retina scans, thermal scans, weights of users, a size of a user, pressure (e.g., within floor sensors), etc., and may determine a biometric profile corresponding to a user. The biometric component 912 may distinguish between a user and sound from a television, for example. Thus, the biometric component 912 may incorporate biometric information into a confidence level for determining an identity of a user.

The RF component 914 may use RF localization to track devices that a user may carry or wear. For example, a user may be associated with a device. The device may emit RF signals (e.g., Wi-Fi, Bluetooth®, etc.). The user device 110 may detect the signal and indicate to the RF component 914 the strength of the signal (e.g., as a received signal strength indication (RSSI)). The RF component 914 may use the RSSI to determine an identity of a user (with an associated confidence level). In some instances, the RF component 914 may determine that a received RF signal is associated with a mobile device that is associated with a particular user identifier.

In some instances, the user device 110 may include some RF or other detection processing capabilities so that a user who speaks an input may scan, tap, or otherwise acknowledge his/her personal device to the user device 110. In this manner, the user may "register" with the user device 110 for purposes of the user device 110 determining who spoke a particular input. Such a registration may occur prior to, during, or after speaking of an input.

The ML component 916 may track the behavior of various users as a factor in determining a confidence level of the identity of the user. For example, a user may adhere to a regular schedule such that the user is at a first location during the day (e.g., at work or at school). In this example, the ML component 916 factors in past behavior and/or trends into determining the identity of the user that provided input to the user device 110. Thus, the ML component 916 may use historical data and/or usage patterns over time to increase or decrease a confidence level of an identity of a user.

In some instances, the recognition confidence component 918 receives determinations from the various components 908, 910, 912, 914, and 916, and may determine a final confidence level associated with the identity of a user. The confidence level or other score data may be included in the user-recognition data 995.

The audio component 910 may receive data from one or more sensors capable of providing an audio signal (e.g., one or more microphones) to facilitate recognizing a user. The audio component 910 may perform audio recognition on an audio signal to determine an identity of the user and associated user identifier. In some instances, the audio component 910 may perform voice recognition to determine an identity of a user.

The audio component 910 may also perform user identification based on audio received by the user device 110. The audio component 910 may determine scores indicating whether speech in the audio originated from particular users. For example, a first score may indicate a likelihood that speech in the audio originated from a first user associated with a first user identifier, a second score may indicate a likelihood that speech in the audio originated from a second user associated with a second user identifier, etc. The audio component 910 may perform user recognition by comparing audio characteristics representing the audio to stored audio characteristics of users.

FIG. 10 is a block diagram of some components of the autonomously motile device 110 such as network interfaces 1019, sensors 1054, and output devices, according to some implementations. The components illustrated here are provided by way of illustration and not necessarily as a limitation. For example, the autonomously motile device 110 may utilize a subset of the particular network interfaces 1019, output devices, or sensors 1054 depicted here, or may utilize components not pictured. One or more of the sensors 1054, output devices, or a combination thereof may be included on a moveable component that may be panned, tilted, rotated, or any combination thereof with respect to a chassis of the autonomously motile device 110.

Figure 12:
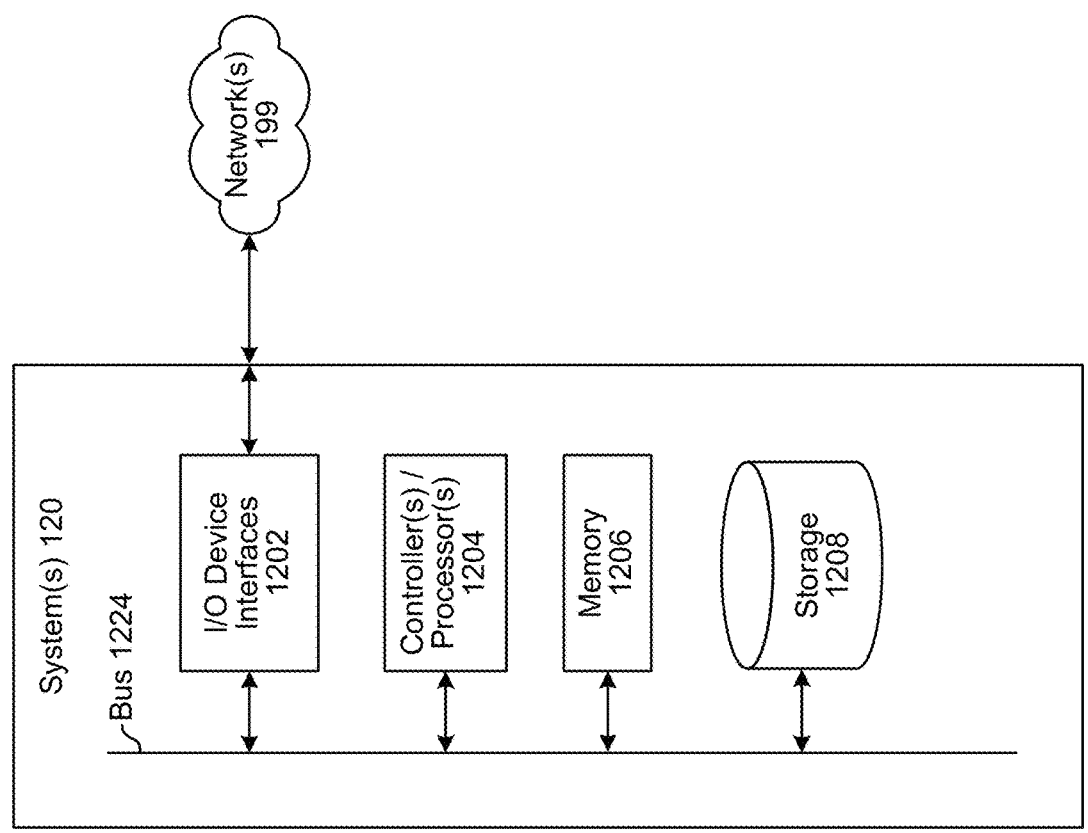
FIG. 12 illustrates a block diagram of a server according to embodiments of the present disclosure.

With reference also to FIG. 12, the autonomously motile device 110 and/or server 120 may include input/output device interfaces 1002/1202 that connect to a variety of components such as an audio output component like a loudspeaker 220, a wired or wireless headset, or other component capable of outputting audio. The autonomously motile device 110 may also include an audio capture component. The audio capture component may be, for example, a microphone 1020 or array of microphones 210, a wired headset or a wireless headset, etc. If an array of microphones is included, approximate distance to a sound's point of origin may be determined by acoustic localization based on time and amplitude differences between sounds captured by different microphones of the array. The autonomously motile device 110 may additionally include a display 214 for displaying content. The autonomously motile device 110 may further include a camera 212/216, light, button, actuator, and/or sensor 1054.

The network interfaces 1019 may include one or more of a WLAN interface, PAN interface, secondary radio frequency (RF) link interface, or other interface. The WLAN interface may be compliant with at least a portion of the Wi-Fi specification. For example, the WLAN interface may be compliant with at least a portion of the IEEE 802.11 specification as promulgated by the Institute of Electrical and Electronics Engineers (IEEE). The PAN interface may be compliant with at least a portion of one or more of the Bluetooth, wireless USB, Z-Wave, ZigBee, or other standards. For example, the PAN interface may be compliant with the Bluetooth Low Energy (BLE) specification.

The secondary RF link interface may comprise a radio transmitter and receiver that operate at frequencies different from or using modulation different from the other interfaces. For example, the WLAN interface may utilize frequencies in the 2.4 GHz and 5 GHz Industrial Scientific and Medicine (ISM) bands, while the PAN interface may utilize the 2.4 GHz ISM bands. The secondary RF link interface may comprise a radio transmitter that operates in the 900 MHz ISM band, within a licensed band at another frequency, and so forth. The secondary RF link interface may be utilized to provide backup communication between the autonomously motile device 110 and other devices in the event that communication fails using one or more of the WLAN interface or the PAN interface. For example, in the event the autonomously motile device 110 travels to an area within the environment 302 that does not have Wi-Fi coverage, the autonomously motile device 110 may use the secondary RF link interface to communicate with another device such as a specialized access point, docking station, or other autonomously motile device 110.

The other network interfaces may include other equipment to send or receive data using other wavelengths or phenomena. For example, the other network interface may include an ultrasonic transceiver used to send data as ultrasonic sounds, a visible light system that communicates by modulating a visible light source such as a light-emitting diode, and so forth. In another example, the other network interface may comprise a wireless wide area network (WWAN) interface or a wireless cellular data network interface. Continuing the example, the other network interface may be compliant with at least a portion of the 3G, 4G, Long Term Evolution (LTE), 5G, or other standards. The I/O device interface (1002/6202) may also include and/or communicate with communication components (such as network interface(s) 1019) that allow data to be exchanged between devices such as different physical servers in a collection of servers or other components.

The components of the device(s) 110 and/or the system(s) 620 may include their own dedicated processors, memory, and/or storage. Alternatively, one or more of the components of the device(s) 110 and/or the system(s) 120 may utilize the I/O interfaces (1002/1202), processor(s) (1004/1204), memory (1006/1206), and/or storage (1008/1208) of the device(s) 110 and/or the system(s) 120, respectively. The components may communicate with each other via one or more busses (1024/1224).

FIG. 11A illustrates components that may be stored in a memory of an autonomously motile device according to embodiments of the present disclosure. Although illustrated as included in memory 1006, the components (or portions thereof) may also be included in hardware and/or firmware. FIG. 11B illustrates data that may be stored in a storage of an autonomously motile device according to embodiments of the present disclosure. Although illustrated as stored in storage 1008, the data may be stored in memory 1006 or in another component. FIG. 11C illustrates sensors that may be included as part of an autonomously motile device according to embodiments of the present disclosure.

A position determination component 1132 determines position data 1144 indicative of a position 310 of the feature in the environment 302. In one implementation the position 310 may be expressed as a set of coordinates with respect to the first camera 212a. The position determination component 1132 may use a direct linear transformation triangulation process to determine the position 310 of a feature in the environment 302 based on the difference in apparent location of that feature in two images acquired by two cameras 212 separated by a known distance.

A movement determination module 1133 determines if the feature is stationary or non-stationary. First position data 1144a indicative of a first position 310a of a feature depicted in the first pair of images acquired at time $t_1$ is determined by the position determination component 1132. Second position data 1144b of the same feature indicative of a second position 310b of the same feature as depicted in the second pair of images acquired at time $t_2$ is determined as well. Similar determinations made for data relative to first position 310a and second position 310b may also be made for third position 310c, and so forth.

The movement determination module 1133 may use inertial data from the IMU 1180 or other sensors that provides information about how the autonomously motile device 110 moved between time $t_1$ and time $t_2$. The inertial data and the first position data 1144a is used to provide a predicted position of the feature at the second time. The predicted position is compared to the second position data 1144b to determine if the feature is stationary or non-stationary. If the predicted position is less than a threshold value from the second position 310*b* in the second position data 1144*b*, then the feature is deemed to be stationary.

Features that have been deemed to be stationary may be included in the second feature data. The second feature data may thus exclude non-stationary features and comprise a subset of the first feature data 1148 which comprises stationary features.

The second feature data may be used by a simultaneous localization and mapping (SLAM) component 1134. The SLAM component 1134 may use second feature data to determine pose data 1145 that is indicative of a location of the autonomously motile device 110 at a given time based on the appearance of features in pairs of images. The SLAM component 1134 may also provide trajectory data indicative of the trajectory 304 that is based on a time series of pose data 1145 from the SLAM component 1134.

Other information, such as depth data from a depth sensor, the position data 1144 associated with the features in the second feature data, and so forth, may be used to determine the presence of obstacles 306 in the environment 302 as represented by an occupancy map as represented by occupancy map data 1149.

The occupancy map data 1149 may comprise data that indicates the location of one or more obstacles 306, such as a table, wall, stairwell, and so forth. In some implementations, the occupancy map data 1149 may comprise a plurality of cells with each cell of the plurality of cells representing a particular area in the environment 302. Data, such as occupancy values, may be stored that indicates whether an area of the environment 302 associated with the cell is unobserved, occupied by an obstacle 306, or is unoccupied. An obstacle 306 may comprise an object or feature that prevents or impairs traversal by the autonomously motile device 110. For example, an obstacle 306 may comprise a wall, stairwell, and so forth.

The occupancy map data 1149 may be manually or automatically determined. For example, during a learning phase the user may take the autonomously motile device 110 on a tour of the environment 302, allowing the mapping component 1130 of the autonomously motile device 110 to determine the occupancy map data 1149. The user may provide input data such as tags designating a particular obstacle type, such as "furniture" or "fragile". In another example, during subsequent operation, the autonomously motile device 110 may generate the occupancy map data 1149 that is indicative of locations and types of obstacles such as chairs, doors, stairwells, and so forth as it moves unattended through the environment 302.

Modules described herein, such as the mapping component 1130, may provide various processing functions such as de-noising, filtering, and so forth. Processing of sensor data 1147, such as image data from a camera 212, may be performed by a module implementing, at least in part, one or more of the following tools or techniques. In one implementation, processing of image data may be performed, at least in part, using one or more tools available in the OpenCV library as developed by Intel Corporation of Santa Clara, California, USA; Willow Garage of Menlo Park, California, USA; and Itseez of Nizhny Novgorod, Russia, with information available at www.opencv.org. In another implementation, functions available in the OKAO machine vision library as promulgated by Omron Corporation of Kyoto, Japan, may be used to process the sensor data 1147. In still another implementation, functions such as those in the Machine Vision Toolbox (MVTB) available using MAT-LAB as developed by MathWorks, Inc. of Natick, Massachusetts, USA, may be utilized.

Techniques such as artificial neural networks (ANNs), convolutional neural networks (CNNs), active appearance models (AAMs), active shape models (ASMs), principal component analysis (PCA), cascade classifiers, and so forth, may also be used to process the sensor data 1147 or other data. For example, the ANN may be trained using a supervised learning algorithm such that object identifiers are associated with images of particular objects within training images provided to the ANN. Once trained, the ANN may be provided with the sensor data 1147 and produce output indicative of the object identifier.

A navigation map component 1135 uses the occupancy map data 1149 as input to generate a navigation map as represented by navigation map data 1150. For example, the navigation map component 1135 may produce the navigation map data 1150 by inflating or enlarging the apparent size of obstacles 306 as indicated by the occupancy map data 1149.

An autonomous navigation component 1136 provides the autonomously motile device 110 with the ability to navigate within the environment 302 without real-time human interaction. The autonomous navigation component 1136 may implement, or operate in conjunction with, the mapping component 1130 to determine one or more of the occupancy map data 1149, the navigation map data 1150, or other representations of the environment 302.

The autonomously motile device 110 autonomous navigation component 1136 may generate path plan data 1152 that is indicative of a path through the environment 302 from the current location to a destination location. The autonomously motile device 110 may then begin moving along the path.

While moving along the path, the autonomously motile device 110 may assess the environment 302 and update or change the path as appropriate. For example, if an obstacle 306 appears in the path, the mapping component 1130 may determine the presence of the obstacle 306 as represented in the occupancy map data 1149 and navigation map data 1150. The now updated navigation map data 1150 may then be used to plan an alternative path to the destination location.

The autonomously motile device 110 may utilize one or more task components 1141. The task component 1141 comprises instructions that, when executed, provide one or more functions. The task components 1141 may perform functions such as finding a user, following a user, present output on output devices of the autonomously motile device 110, perform sentry tasks by moving the autonomously motile device 110 through the environment 302 to determine the presence of unauthorized people, and so forth.

The autonomously motile device 110 includes one or more output devices, such as one or more of a motor, light, speaker, display, projector, printer, and so forth. One or more output devices may be used to provide output during operation of the autonomously motile device 110.

The autonomously motile device 110 may use the network interfaces 1019 to connect to a network 199. For example, the network 199 may comprise a wireless local area network, that in turn is connected to a wide-area network such as the Internet.

The autonomously motile device 110 may be configured to dock or connect to a docking station. The docking station may also be connected to the network 199. For example, the docking station may be configured to connect to the wireless local area network 199 such that the docking station and the autonomously motile device 110 may communicate. The docking station may provide external power which the autonomously motile device 110 may use to charge a battery of the autonomously motile device 110.

The autonomously motile device 110 may access one or more servers 620 via the network 199. For example, the autonomously motile device 110 may utilize a wakeword detection component to determine if the user is addressing a request to the autonomously motile device 110. The wakeword detection component may hear a specified word or phrase and transition the autonomously motile device 110 or portion thereof to the wake operating mode. Once in the wake operating mode, the autonomously motile device 110 may then transfer at least a portion of the audio spoken by the user to one or more servers 620 for further processing. The servers 620 may process the spoken audio and return to the autonomously motile device 110 data that may be subsequently used to operate the autonomously motile device 110.

The autonomously motile device 110 may also communicate with other devices. The other devices may include one or more devices that are within the physical space such as a home or associated with operation of one or more devices in the physical space. For example, the other devices may include a doorbell camera, a garage door opener, a refrigerator, washing machine, and so forth.

In other implementations, other types of autonomous motile devices 110 may use the systems and techniques described herein. For example, the autonomously motile device 110 may comprise an autonomous ground vehicle that is moving on a street, an autonomous aerial vehicle in the air, autonomous marine vehicle, and so forth.

The autonomously motile device 110 may include one or more batteries (not shown) to provide electrical power suitable for operating the components in the autonomously motile device 110. In some implementations other devices may be used to provide electrical power to the autonomously motile device 110. For example, power may be provided by wireless power transfer, capacitors, fuel cells, storage flywheels, and so forth. One or more clocks may provide information indicative of date, time, ticks, and so forth. For example, the processor 1004 may use data from the clock to associate a particular time with an action, sensor data 1147, and so forth.

The autonomously motile device 110 may include one or more hardware processors 1004 (processors) configured to execute one or more stored instructions. The processors 1004 may comprise one or more cores. The processors 1004 may include microcontrollers, systems on a chip, field programmable gate arrays, digital signal processors, graphic processing units, general processing units, and so forth.

The autonomously motile device 110 may include one or more communication component 1140 such as input/output (I/O) interfaces 1002, network interfaces 1019, and so forth. The communication component 1140 enable the autonomously motile device 110, or components thereof, to communicate with other devices or components. The communication component 1140 may include one or more I/O interfaces 1002. The I/O interfaces 1002 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 1002 may couple to one or more I/O devices. The I/O devices may include input devices such as one or more of a sensor 1054, keyboard, mouse, scanner, and so forth. The I/O devices may also include output devices such as one or more of a motor, light, speaker 220, display 214, projector, printer, and so forth. In some embodiments, the I/O devices may be physically incorporated with the autonomously motile device 110 or may be externally placed.

The I/O interface(s) 1002 may be configured to provide communications between the autonomously motile device 110 and other devices such as other devices 110, docking stations, routers, access points, and so forth, for example through antenna 1010 and/or other component. The I/O interface(s) 1002 may include devices configured to couple to personal area networks (PANs), local area networks (LANs), wireless local area networks (WLANS), wide area networks (WANs), and so forth. For example, the network interfaces 1019 may include devices compatible with Ethernet, Wi-Fi, Bluetooth, Bluetooth Low Energy, ZigBee, and so forth. The autonomously motile device 110 may also include one or more busses 1024 or other internal communications hardware or software that allow for the transfer of data between the various modules and components of the autonomously motile device 110.

As shown in FIG. 11A, the autonomously motile device 110 includes one or more memories 1006. The memory 1006 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 1006 provides storage of computer-readable instructions, data structures, program modules, and other data for the operation of the autonomously motile device 110. A few example functional modules are shown stored in the memory 1006, although the same functionality may alternatively be implemented in hardware, firmware, or as a system on a chip (SoC).

The memory 1006 may include at least one operating system (OS) component 1139. The OS component 1139 is configured to manage hardware resource devices such as the I/O interfaces 1002, the I/O devices, the communication component 1140, and provide various services to applications or modules executing on the processors 1004. The OS component 1139 may implement a variant of the FreeBSD operating system as promulgated by the FreeBSD Project; other UNIX or UNIX-like variants; a variation of the Linux operating system as promulgated by Linus Torvalds; and/or the Windows operating system from Microsoft Corporation of Redmond, Washington.

Also stored in the memory 1006, or elsewhere may be a data store 1008 and one or more of the following modules. These modules may be executed as foreground applications, background tasks, daemons, and so forth. The data store 1008 may use a flat file, database, linked list, tree, executable code, script, or other data structure to store information. In some implementations, the data store 1008 or a portion of the data store 1008 may be distributed across one or more other devices including other devices 110, servers 620, network attached storage devices, and so forth.

A communication component 1140 may be configured to establish communication with other devices, such as other devices 110, an external server 620, a docking station, and so forth. The communications may be authenticated, encrypted, and so forth.

Other modules within the memory 1006 may include a safety component 1129, the mapping component 1130, the navigation map component 1135, the autonomous navigation component 1136, the one or more components 1141, a speech processing component 1137, or other components. The components may access data stored within the data store 1008, including safety tolerance data 1146, sensor data 1147, inflation parameters, other data, and so forth.

The safety component 1129 may access the safety tolerance data 1146 to determine within what tolerances the autonomously motile device 110 may operate safely within the environment 302. For example, the safety component 1129 may be configured to stop the autonomously motile device 110 from moving when an extensible mast 256 of the autonomously motile device 110 is extended. In another example, the safety tolerance data 1146 may specify a minimum sound threshold which, when exceeded, stops all movement of the autonomously motile device 110. Continuing this example, detection of sound such as a human yell would stop the autonomously motile device 110. In another example, the safety component 1129 may access safety tolerance data 1146 that specifies a minimum distance from an object that the autonomously motile device 110 is to maintain. Continuing this example, when a sensor 1054 detects an object has approached to less than the minimum distance, all movement of the autonomously motile device 110 may be stopped. Movement of the autonomously motile device 110 may be stopped by one or more of inhibiting operations of one or more of the motors, issuing a command to stop motor operation, disconnecting power from one or more the motors, and so forth. The safety component 1129 may be implemented as hardware, software, or a combination thereof.

The safety component 1129 may control other factors, such as a maximum speed of the autonomously motile device 110 based on information obtained by the sensors 1054, precision and accuracy of the sensor data 1147, and so forth. For example, detection of an object by an optical sensor may include some error, such as when the distance to an object comprises a weighted average between an object and a background. As a result, the maximum speed permitted by the safety component 1129 may be based on one or more factors such as the weight of the autonomously motile device 110, nature of the floor, distance to the object, and so forth. In the event that the maximum permissible speed differs from the maximum speed permitted by the safety component 1129, the lesser speed may be utilized.

The navigation map component 1135 uses the occupancy map data 1149 as input to generate the navigation map data 1150. The navigation map component 1135 may produce the navigation map data 1150 to inflate or enlarge the obstacles 306 indicated by the occupancy map data 1149. One or more inflation parameters may be used during operation. The inflation parameters provide information such as inflation distance, inflation adjustment values, and so forth. In some implementations the inflation parameters may be based at least in part on the sensor field-of-view 308, sensor blind spot, physical dimensions of the autonomously motile device 110, and so forth.

The speech processing component 1137 may be used to process utterances of the user. Microphones may acquire audio in the presence of the autonomously motile device 110 and may send raw audio data 1143 to an acoustic front end (AFE). The AFE may transform the raw audio data 1143 (for example, a single-channel, 16-bit audio stream sampled at 16 kHz), captured by the microphone, into audio feature vectors that may ultimately be used for processing by various components, such as a wakeword detection module 1138, speech recognition engine, or other components. The AFE may reduce noise in the raw audio data 1143. The AFE may also perform acoustic echo cancellation (AEC) or other operations to account for output audio data that may be sent to a speaker of the autonomously motile device 110 for output. For example, the autonomously motile device 110 may be playing music or other audio that is being received from a network 199 in the form of output audio data. To prevent the output audio interfering with the device's ability to detect and process input audio, the AFE or other component may perform echo cancellation to remove the output audio data from the input raw audio data 1143, or other operations.

The AFE may divide the raw audio data 1143 into frames representing time intervals for which the AFE determines a number of values (i.e., features) representing qualities of the raw audio data 1143, along with a set of those values (i.e., a feature vector or audio feature vector) representing features/qualities of the raw audio data 1143 within each frame. A frame may be a certain period of time, for example a sliding window of 25 ms of audio data taken every 10 ms, or the like. Many different features may be determined, as known in the art, and each feature represents some quality of the audio that may be useful for automatic speech recognition (ASR) processing, wakeword detection, presence detection, or other operations. A number of approaches may be used by the AFE to process the raw audio data 1143, such as mel-frequency cepstral coefficients (MFCCs), log filter-bank energies (LFBEs), perceptual linear predictive (PLP) techniques, neural network feature vector techniques, linear discriminant analysis, semi-tied covariance matrices, or other approaches known to those skilled in the art.

The audio feature vectors (or the raw audio data 1143) may be input into a wakeword detection module 1138 that is configured to detect keywords spoken in the audio. The wakeword detection module 1138 may use various techniques to determine whether audio data includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the autonomously motile device 110 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio received by the autonomously motile device 110 (or separately from speech detection), the autonomously motile device 110 may use the wakeword detection module 1138 to perform wakeword detection to determine when a user intends to speak a command to the autonomously motile device 110. This process may also be referred to as keyword detection, with the wakeword being a specific example of a keyword. Specifically, keyword detection is typically performed without performing linguistic analysis, textual analysis, or semantic analysis. Instead, incoming audio is analyzed to determine if specific characteristics of the audio match preconfigured acoustic waveforms, audio signatures, or other data to determine if the incoming audio "matches" stored audio data corresponding to a keyword.

Thus, the wakeword detection module 1138 may compare audio data to stored models or data to detect a wakeword. One approach for wakeword detection general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds HMMs for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating a hybrid deep neural network (DNN) Hidden Markov Model (HMM) decoding framework. In another embodiment, the wakeword spotting system may be built on DNN/recursive neural network (RNN) structures directly, without HMM involved. Such a system may estimate the posteriors of wakewords with context information, either by stacking frames within a context window for DNN, or using RNN. Following on, posterior threshold tuning or smoothing is applied for decision making. Other techniques for wakeword detection, such as those known in the art, may also be used.

Once the wakeword is detected, circuitry or applications of the local autonomously motile device 110 may "wake" and begin transmitting audio data (which may include one or more of the raw audio data 1143 or the audio feature vectors) to one or more server(s) 620 for speech processing. The audio data corresponding to audio obtained by the microphone may be processed locally on one or more of the processors 1004, sent to a server 620 for routing to a recipient device or may be sent to the server 620 for speech processing for interpretation of the included speech (either for purposes of enabling voice-communications and/or for purposes of executing a command in the speech). The audio data may include data corresponding to the wakeword, or the portion of the audio data corresponding to the wakeword may be removed by the autonomously motile device 110 before processing by the navigation map component 1135, prior to sending to the server 620, and so forth.

The speech processing component 1137 may include or access an automated speech recognition (ASR) module. The ASR module may accept as input raw audio data 1143, audio feature vectors, or other sensor data 1147 and so forth and may produce as output the input data comprising a text string or other data representation. The input data comprising the text string or other data representation may be processed by the navigation map component 1135 to determine the command to be executed. For example, the utterance of the command "robot, come here" may result in input data comprising the text string "come here". The wakeword "robot" may be omitted from the input data.

The autonomous navigation component 1136 provides the autonomously motile device 110 with the ability to navigate within the environment 302 without real-time human interaction. The autonomous navigation component 1136 may implement, or operate in conjunction with, the mapping component 1130 to determine the occupancy map data 1149, the navigation map data 1150, or other representation of the environment 302. In one implementation, the mapping component 1130 may use one or more simultaneous localization and mapping ("SLAM") techniques. The SLAM algorithms may utilize one or more of maps, algorithms, beacons, or other techniques to navigate. The autonomous navigation component 1136 may use the navigation map data 1150 to determine a set of possible paths along which the autonomously motile device 110 may move. One of these may be selected and used to determine path plan data 1152 indicative of a path. For example, a possible path that is the shortest or has the fewest turns may be selected and used to determine the path. The path is then subsequently used to determine a set of commands that drive the motors connected to the wheels. For example, the autonomous navigation component 1136 may determine the current location within the environment 302 and determine path plan data 1152 that describes the path to a destination location such as the docking station.

The autonomous navigation component 1136 may utilize various techniques during processing of sensor data 1147. For example, image data 1142 obtained from cameras 212 on the autonomously motile device 110 may be processed to determine one or more of corners, edges, planes, and so forth. In some implementations, corners may be detected and the coordinates of those corners may be used to produce point cloud data. This point cloud data may then be used for SLAM or other purposes associated with mapping, navigation, and so forth.

The autonomously motile device 110 may move responsive to a determination made by an onboard processor 1004, in response to a command received from one or more network interfaces 1019, as determined from the sensor data 1147, and so forth. For example, an external server 620 may send a command that is received using the network interface 1019. This command may direct the autonomously motile device 110 to proceed to find a particular user, follow a particular user, and so forth. The autonomously motile device 110 may then process this command and use the autonomous navigation component 1136 to determine the directions and distances associated with carrying out the command. For example, the command to "come here" may result in a task component 1141 sending a command to the autonomous navigation component 1136 to move the autonomously motile device 110 to a particular location near the user and orient the autonomously motile device 110 in a particular direction.

The autonomously motile device 110 may connect to the network 199 using one or more of the network interfaces 1019. In some implementations, one or more of the modules or other functions described here may execute on the processors 1004 of the autonomously motile device 110, on the server 620, or a combination thereof. For example, one or more servers 620 may provide various functions, such as ASR, natural language understanding (NLU), providing content such as audio or video to the autonomously motile device 110, and so forth.

The other components may provide other functionality, such as object recognition, speech synthesis, user identification, and so forth. The other components may comprise a speech synthesis module that is able to convert text data to human speech. For example, the speech synthesis module may be used by the autonomously motile device 110 to provide speech that a user is able to understand.

The data store 1008 may store the other data as well. For example, localization settings may indicate local preferences such as language, user identifier data may be stored that allows for identification of a particular user, and so forth.

As shown in FIG. 11C, the autonomously motile device 110 may include one or more of the following sensors 1054.

The sensors 1054 depicted here are provided by way of illustration and not necessarily as a limitation. It is understood that other sensors 1054 may be included or utilized by the autonomously motile device 110, while some sensors 1054 may be omitted in some configurations.

A motor encoder 1155 provides information indicative of the rotation or linear extension of a motor. The motor may comprise a rotary motor, or a linear actuator. In some implementations, the motor encoder 1155 may comprise a separate assembly such as a photodiode and encoder wheel that is affixed to the motor. In other implementations, the motor encoder 1155 may comprise circuitry configured to drive the motor. For example, the autonomous navigation component 1136 may utilize the data from the motor encoder 1155 to estimate a distance traveled.

A suspension weight sensor 1156 provides information indicative of the weight of the autonomously motile device 110 on the suspension system for one or more of the wheels or the caster. For example, the suspension weight sensor 1156 may comprise a switch, strain gauge, load cell, photodetector, or other sensing element that is used to determine whether weight is applied to a particular wheel, or whether weight has been removed from the wheel. In some implementations, the suspension weight sensor 1156 may provide binary data such as a "1" value indicating that there is a weight applied to the wheel, while a "0" value indicates that there is no weight applied to the wheel. In other implementations, the suspension weight sensor 1156 may provide an indication such as so many kilograms of force or newtons of force. The suspension weight sensor 1156 may be affixed to one or more of the wheels or the caster. In some situations, the safety component 1129 may use data from the suspension weight sensor 1156 to determine whether or not to inhibit operation of one or more of the motors. For example, if the suspension weight sensor 1156 indicates no weight on the suspension, the implication is that the autonomously motile device 110 is no longer resting on its wheels, and thus operation of the motors may be inhibited. In another example, if the suspension weight sensor 1156 indicates weight that exceeds a threshold value, the implication is that something heavy is resting on the autonomously motile device 110 and thus operation of the motors may be inhibited.

One or more bumper switches 1157 provide an indication of physical contact between a bumper or other member that is in mechanical contact with the bumper switch 1157. The safety component 1129 utilizes sensor data 1147 obtained by the bumper switches 1157 to modify the operation of the autonomously motile device 110. For example, if the bumper switch 1157 associated with a front of the autonomously motile device 110 is triggered, the safety component 1129 may drive the autonomously motile device 110 backwards.

A floor optical motion sensor 1158 provides information indicative of motion of the autonomously motile device 110 relative to the floor or other surface underneath the autonomously motile device 110. In one implementation, the floor optical-motion sensors 1158 may comprise a light source such as light-emitting diode (LED), an array of photodiodes, and so forth. In some implementations, the floor optical-motion sensors 1158 may utilize an optoelectronic sensor, such as a low-resolution two-dimensional array of photodiodes. Several techniques may be used to determine changes in the data obtained by the photodiodes and translate this into data indicative of a direction of movement, velocity, acceleration, and so forth. In some implementations, the floor optical-motion sensors 1158 may provide other information, such as data indicative of a pattern present on the floor, composition of the floor, color of the floor, and so forth. For example, the floor optical-motion sensors 1158 may utilize an optoelectronic sensor that may detect different colors or shades of gray, and this data may be used to generate floor characterization data. The floor characterization data may be used for navigation.

An ultrasonic sensor 1159 utilizes sounds in excess of 20 kHz to determine a distance from the sensor 1054 to an object. The ultrasonic sensor 1159 may comprise an emitter such as a piezoelectric transducer and a detector such as an ultrasonic microphone. The emitter may generate specifically timed pulses of ultrasonic sound while the detector listens for an echo of that sound being reflected from an object within the field of view. The ultrasonic sensor 1159 may provide information indicative of a presence of an object, distance to the object, and so forth. Two or more ultrasonic sensors 1159 may be utilized in conjunction with one another to determine a location within a two-dimensional plane of the object.

In some implementations, the ultrasonic sensor 1159 or a portion thereof may be used to provide other functionality. For example, the emitter of the ultrasonic sensor 1159 may be used to transmit data and the detector may be used to receive data transmitted that is ultrasonic sound. In another example, the emitter of an ultrasonic sensor 1159 may be set to a particular frequency and used to generate a particular waveform such as a sawtooth pattern to provide a signal that is audible to an animal, such as a dog or a cat.

An optical sensor 1160 may provide sensor data 1147 indicative of one or more of a presence or absence of an object, a distance to the object, or characteristics of the object. The optical sensor 1160 may use time-of-flight, structured light, interferometry, or other techniques to generate the distance data. For example, time-of-flight determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. The optical sensor 1160 may utilize one or more sensing elements. For example, the optical sensor 1160 may comprise a 4×4 array of light sensing elements. Each individual sensing element may be associated with a field-of-view 308 that is directed in a different way. For example, the optical sensor 1160 may have four light sensing elements, each associated with a different 100 field-of-view 308, allowing the sensor to have an overall field-of-view 308 of 40°.

In another implementation, a structured light pattern may be provided by the optical emitter. A portion of the structured light pattern may then be detected on the object using a sensor 1054 such as an image sensor or camera 212. Based on an apparent distance between the features of the structured light pattern, the distance to the object may be calculated. Other techniques may also be used to determine distance to the object. In another example, the color of the reflected light may be used to characterize the object, such as whether the object is skin, clothing, flooring, upholstery, and so forth. In some implementations, the optical sensor 1160 may operate as a depth camera, providing a two-dimensional image of a scene, as well as data that indicates a distance to each pixel.

Data from the optical sensors 1160 may be utilized for collision avoidance. For example, the safety component 1129 and the autonomous navigation component 1136 may utilize the sensor data 1147 indicative of the distance to an object in order to prevent a collision with that object.

Multiple optical sensors 1160 may be operated such that their field-of-view 308 overlap at least partially. To minimize or eliminate interference, the optical sensors 1160 may selectively control one or more of the timing, modulation, or frequency of the light emitted. For example, a first optical sensor 1160 may emit light modulated at 30 kHz while a second optical sensor 1160 emits light modulated at 33 kHz.

A lidar 1161 sensor provides information indicative of a distance to an object or portion thereof by utilizing laser light. The laser is scanned across a scene at various points, emitting pulses which may be reflected by objects within the scene. Based on the time-of-flight distance to that particular point, sensor data 1147 may be generated that is indicative of the presence of objects and the relative positions, shapes, and so forth that are visible to the lidar 1161. Data from the lidar 1161 may be used by various modules. For example, the autonomous navigation component 1136 may utilize point cloud data generated by the lidar 1161 for localization of the autonomously motile device 110 within the environment 302.

The autonomously motile device 110 may include a mast 256. A mast position sensor 1162 provides information indicative of a position of the mast 256 of the autonomously motile device 110. For example, the mast position sensor 1162 may comprise limit switches associated with the mast extension mechanism that indicate whether the mast 256 is at an extended or retracted position. In other implementations, the mast position sensor 1162 may comprise an optical code on at least a portion of the mast 256 that is then interrogated by an optical emitter and a photodetector to determine the distance to which the mast 256 is extended. In another implementation, the mast position sensor 1162 may comprise an encoder wheel that is attached to a mast motor that is used to raise or lower the mast 256. The mast position sensor 1162 may provide data to the safety component 1129. For example, if the autonomously motile device 110 is preparing to move, data from the mast position sensor 1162 may be checked to determine if the mast 256 is retracted, and if not, the mast 256 may be retracted prior to beginning movement.

A mast strain sensor 1163 provides information indicative of a strain on the mast with respect to the remainder of the autonomously motile device 110. For example, the mast strain sensor 1163 may comprise a strain gauge or load cell that measures a side-load applied to the mast or a weight on the mast or downward pressure on the mast. The safety component 1129 may utilize sensor data 1147 obtained by the mast strain sensor 1163. For example, if the strain applied to the mast exceeds a threshold amount, the safety component 1129 may direct an audible and visible alarm to be presented by the autonomously motile device 110.

The autonomously motile device 110 may include a modular payload bay. A payload weight sensor 1165 provides information indicative of the weight associated with the modular payload bay. The payload weight sensor 1165 may comprise one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms may operate as transducers that generate one or more signals based on an applied force, such as that of the load due to gravity. For example, the payload weight sensor 1165 may comprise a load cell having a strain gauge and a structural member that deforms slightly when weight is applied. By measuring a change in the electrical characteristic of the strain gauge, such as capacitance or resistance, the weight may be determined. In another example, the payload weight sensor 1165 may comprise a force sensing resistor (FSR). The FSR may comprise a resilient material that changes one or more electrical characteristics when compressed. For example, the electrical resistance of a particular portion of the FSR may decrease as the particular portion is compressed. In some implementations, the safety component 1129 may utilize the payload weight sensor 1165 to determine if the modular payload bay has been overloaded. If so, an alert or notification may be issued.

One or more device temperature sensors 1166 may be utilized by the autonomously motile device 110. The device temperature sensors 1166 provide temperature data of one or more components within the autonomously motile device 110. For example, a device temperature sensor 1166 may indicate a temperature of one or more the batteries, one or more motors, and so forth. In the event the temperature exceeds a threshold value, the component associated with that device temperature sensor 1166 may be shut down.

One or more interlock sensors 1167 may provide data to the safety component 1129 or other circuitry that prevents the autonomously motile device 110 from operating in an unsafe condition. For example, the interlock sensors 1167 may comprise switches that indicate whether an access panel is open. The interlock sensors 1167 may be configured to inhibit operation of the autonomously motile device 110 until the interlock switch indicates a safe condition is present.

An inertial measurement unit (IMU) 1180 may include a plurality of gyroscopes 1181 and accelerometers 1182 arranged along different axes. The gyroscope 1181 may provide information indicative of rotation of an object affixed thereto. For example, a gyroscope 1181 may generate sensor data 1147 that is indicative of a change in orientation of the autonomously motile device 110 or a portion thereof.

The accelerometer 1182 provides information indicative of a direction and magnitude of an imposed acceleration. Data such as rate of change, determination of changes in direction, speed, and so forth may be determined using the accelerometer 1182. The accelerometer 1182 may comprise mechanical, optical, micro-electromechanical, or other devices. For example, the gyroscope 1181 in the accelerometer 1182 may comprise a prepackaged solid-state unit.

A magnetometer 1168 may be used to determine an orientation by measuring ambient magnetic fields, such as the terrestrial magnetic field. For example, the magnetometer 1168 may comprise a Hall effect transistor that provides output compass data indicative of a magnetic heading.

The autonomously motile device 110 may include one or more location sensors 1169. The location sensors 1169 may comprise an optical, radio, or other navigational system such as a global positioning system (GPS) receiver. For indoor operation, the location sensors 1169 may comprise indoor position systems, such as using Wi-Fi Positioning Systems (WPS). The location sensors 1169 may provide information indicative of a relative location, such as "living room" or an absolute location such as particular coordinates indicative of latitude and longitude, or displacement with respect to a predefined origin.

A photodetector 1170 provides sensor data 1147 indicative of impinging light. For example, the photodetector 1170 may provide data indicative of a color, intensity, duration, and so forth.

A camera 212 generates sensor data 1147 indicative of one or more images. The camera 212 may be configured to detect light in one or more wavelengths including, but not limited to, terahertz, infrared, visible, ultraviolet, and so forth. For example, an infrared camera 212 may be sensitive to wavelengths between approximately 700 nanometers and 1 millimeter. The camera 212 may comprise charge coupled devices (CCD), complementary metal oxide semiconductor (CMOS) devices, microbolometers, and so forth. The autonomously motile device 110 may use image data acquired by the camera 212 for object recognition, navigation, collision avoidance, user communication, and so forth. For example, a pair of cameras 212 sensitive to infrared light may be mounted on the front of the autonomously motile device 110 to provide binocular stereo vision, with the sensor data 1147 comprising images being sent to the autonomous navigation component 1136. In another example, the camera 212 may comprise a 10 megapixel or greater camera that is used for videoconferencing or for acquiring pictures for the user.

The camera 212 may include a global shutter or a rolling shutter. The shutter may be mechanical or electronic. A mechanical shutter uses a physical device such as a shutter vane or liquid crystal to prevent light from reaching a light sensor. In comparison, an electronic shutter comprises a specific technique of how the light sensor is read out, such as progressive rows, interlaced rows, and so forth. With a rolling shutter, not all pixels are exposed at the same time. For example, with an electronic rolling shutter, rows of the light sensor may be read progressively, such that the first row on the sensor was taken at a first time while the last row was taken at a later time. As a result, a rolling shutter may produce various image artifacts, especially with regard to images in which objects are moving. In contrast, with a global shutter the light sensor is exposed all at a single time, and subsequently read out. In some implementations, the camera(s) 212, particularly those associated with navigation or autonomous operation, may utilize a global shutter. In other implementations, the camera(s) 212 providing images for use by the autonomous navigation component 1136 may be acquired using a rolling shutter and subsequently may be processed to mitigate image artifacts.

One or more microphones 1020 may be configured to acquire information indicative of sound present in the environment 302. In some implementations, array(s) 210 of microphones 1020 may be used. These array(s) 210 may implement beamforming techniques to provide for directionality of gain. The autonomously motile device 110 may use the one or more microphones 1020 to acquire information from acoustic tags, accept voice input from users, determine a direction of an utterance, determine ambient noise levels, for voice communication with another user or system, and so forth.

An air pressure sensor 1172 may provide information indicative of an ambient atmospheric pressure or changes in ambient atmospheric pressure. For example, the air pressure sensor 1172 may provide information indicative of changes in air pressure due to opening and closing of doors, weather events, and so forth.

An air quality sensor 1173 may provide information indicative of one or more attributes of the ambient atmosphere. For example, the air quality sensor 1173 may include one or more chemical sensing elements to detect the presence of carbon monoxide, carbon dioxide, ozone, and so forth. In another example, the air quality sensor 1173 may comprise one or more elements to detect particulate matter in the air, such as the photoelectric detector, ionization chamber, and so forth. In another example, the air quality sensor 1173 may include a hygrometer that provides information indicative of relative humidity.

An ambient light sensor 1174 may comprise one or more photodetectors or other light-sensitive elements that are used to determine one or more of the color, intensity, or duration of ambient lighting around the autonomously motile device 110.

An ambient temperature sensor 1175 provides information indicative of the temperature of the ambient environment 302 proximate to the autonomously motile device 110. In some implementations, an infrared temperature sensor may be utilized to determine the temperature of another object at a distance.

A floor analysis sensor 1176 may include one or more components that are used to generate at least a portion of floor characterization data. In one implementation, the floor analysis sensor 1176 may comprise circuitry that may be used to determine one or more of the electrical resistance, electrical inductance, or electrical capacitance of the floor. For example, two or more of the wheels in contact with the floor may include an allegedly conductive pathway between the circuitry and the floor. By using two or more of these wheels, the circuitry may measure one or more of the electrical properties of the floor. Information obtained by the floor analysis sensor 1176 may be used by one or more of the safety component 1129, the autonomous navigation component 1136, the task component 1141, and so forth. For example, if the floor analysis sensor 1176 determines that the floor is wet, the safety component 1129 may decrease the speed of the autonomously motile device 110 and generate a notification alerting the user.

The floor analysis sensor 1176 may include other components as well. For example, a coefficient of friction sensor may comprise a probe that comes into contact with the surface and determines the coefficient of friction between the probe and the floor.

A caster rotation sensor 1177 provides data indicative of one or more of a direction of orientation, angular velocity, linear speed of the caster, and so forth. For example, the caster rotation sensor 1177 may comprise an optical encoder and corresponding target that is able to determine that the caster transitioned from an angle of 0° at a first time to 49° at a second time. The sensors 1054 may include a radar 1178. The radar 1178 may be used to provide information as to a distance, lateral position, and so forth, to an object. The sensors 1054 may include a passive infrared (PIR) sensor 1164. The PIR 1164 sensor may be used to detect the presence of users, pets, hotspots, and so forth. For example, the PIR sensor 1164 may be configured to detect infrared radiation with wavelengths between 8 and 14 micrometers.

The autonomously motile device 110 may include other sensors as well. For example, a capacitive proximity sensor may be used to provide proximity data to adjacent objects. Other sensors may include radio frequency identification (RFID) readers, near field communication (NFC) systems, coded aperture cameras, and so forth. For example, NFC tags may be placed at various points within the environment 302 to provide landmarks for the autonomous navigation component 1136. One or more touch sensors may be utilized to determine contact with a user or other objects.

The autonomously motile device 110 may include one or more output devices. A motor (not shown) may be used to provide linear or rotary motion. A light (not shown) may be used to emit photons. A speaker 220 may be used to emit sound. A display 214 may comprise one or more of a liquid crystal display, light emitting diode display, electrophoretic display, cholesteric liquid crystal display, interferometric display, and so forth. The display 214 may be used to present visible information such as graphics, pictures, text, and so forth. In some implementations, the display 214 may comprise a touchscreen that combines a touch sensor and a display 214. In some implementations, the autonomously motile device 110 may be equipped with a projector. The projector may be able to project an image on a surface, such as the floor, wall, ceiling, and so forth.

A scent dispenser may be used to emit one or more smells. For example, the scent dispenser may comprise a plurality of different scented liquids that may be evaporated or vaporized in a controlled fashion to release predetermined amounts of each. One or more moveable component actuators may comprise an electrically operated mechanism such as one or more of a motor, solenoid, piezoelectric material, electroactive polymer, shape-memory alloy, and so forth. The actuator controller may be used to provide a signal or other input that operates one or more of the moveable component actuators to produce movement of the moveable component.

In other implementations, other output devices may be utilized. For example, the autonomously motile device 110 may include a haptic output device that provides output that produces particular touch sensations to the user. Continuing the example, a motor with an eccentric weight may be used to create a buzz or vibration to allow the autonomously motile device 110 to simulate the purr of a cat.

As noted above, multiple devices may be employed in a single system. In such a multi-device system, each of the devices may include different components for performing different aspects of the system's processing. The multiple devices may include overlapping components. The components of the autonomously motile device 110 and/or the system(s) 620 as described herein, are illustrative, and may be located as a stand-alone device or may be included, in whole or in part, as a component of a larger device or system.

FIG. 12 is a block diagram conceptually illustrating example components of a system 620, such as remote server, which may assist with processing audio data determined by the device 110, such as with ASR processing, NLU processing, etc. The term "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The system 620 may be configured to operate using one or more of a client-server model, a computer bureau model, grid computing techniques, fog computing techniques, mainframe techniques, utility computing techniques, a peer-to-peer model, sandbox techniques, or other computing techniques.

Multiple servers may be included in the system 620, such as one or more servers for performing ASR processing, one or more servers for performing NLU processing, one or more skill system(s) for performing actions responsive to user inputs, etc. In operation, each of these devices (or groups of devices) may include computer-readable and computer-executable instructions that reside on the respective server.

Figure 13:
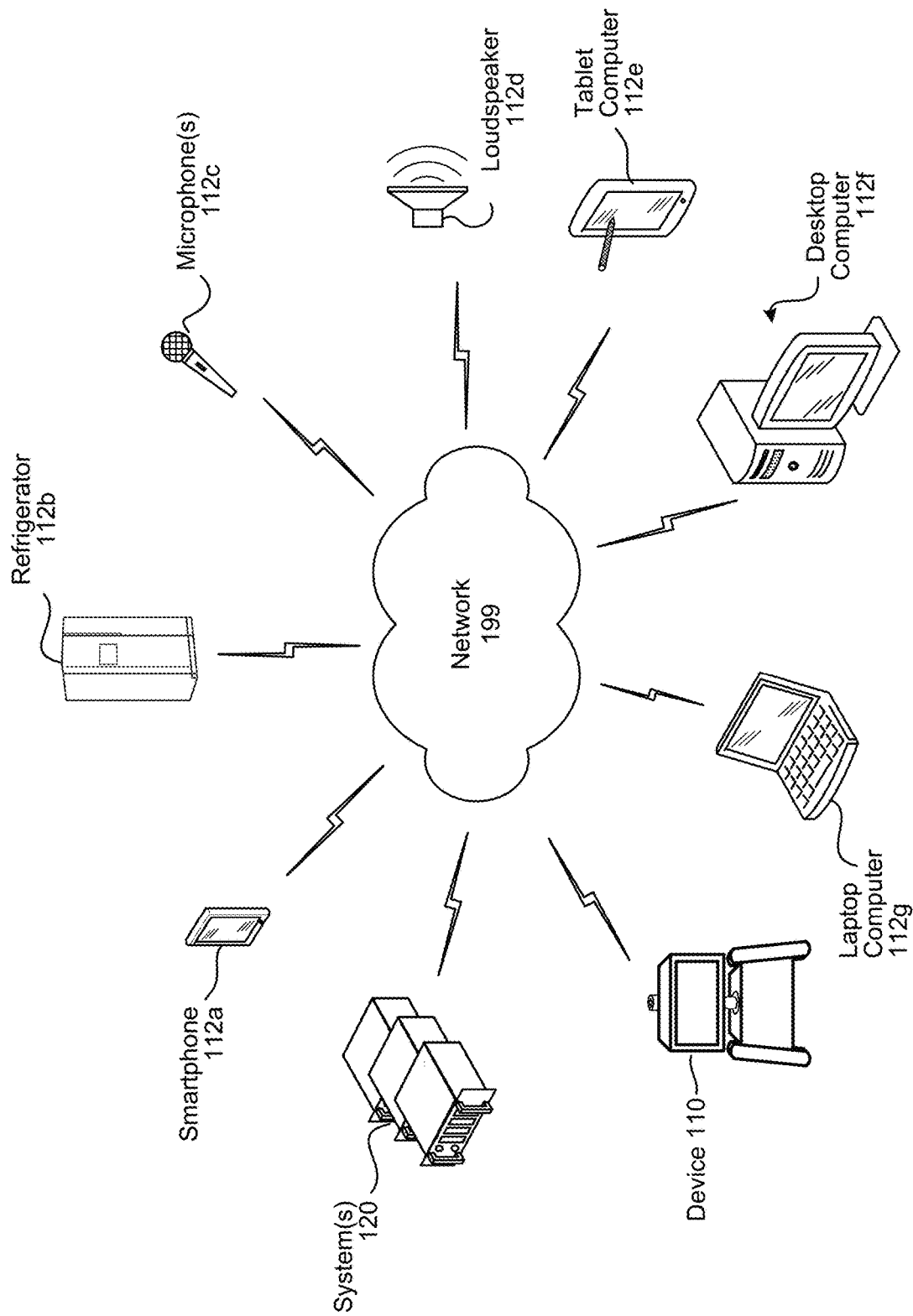
FIG. 13 illustrates a network that includes an autonomously motile device according to embodiments of the present disclosure.

As illustrated in FIG. 13 and as discussed herein, the autonomously motile device 110 may communicate, using the network 199, with the system 620 and/or a user device. The network(s) 199 may include a local or private network or may include a wide network such as the Internet. The devices may be connected to the network(s) 199 through either wired or wireless connections. Example user devices include a cellular phone 112a, a refrigerator 112b, a microphone 112c, a loudspeaker 112d, a tablet computer 112e, a desktop computer 112f, and a laptop computer 112g, which may be connected to the network(s) 199 through a wireless service provider, over a Wi-Fi or cellular network connection, or the like. Other devices are included as network-connected support devices, such as the system(s) 620, the skill system(s), and/or others.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end, which comprises, among other things, analog and/or digital filters (e.g., filters configured as firmware to a digital signal processor).

Various components of the above system are described as using models, machine learning models, trained models, or the like. Absent explicit description to the contrary, models of various types (trained, untrained, etc.), may be used in the place of a other models to perform certain operations depending on the configuration of the system.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, comprising:
    determining first input data representing a first input command to a device, the first input data corresponding to movement of the device;
    determining that the first input command is an unknown command for the device;
    determining that further information is required to configure the device to perform the first input command;
    determining first data representing a first known command corresponding to at least a first portion of the first input data, the first known command corresponding to at least one first mechanical operation for moving the device to a first location;
    determining second data representing a second location corresponding to a second portion of the first input data;
    generating, using the at least one first mechanical operation of the first data and the second data, command data representing at least one second mechanical operation for moving the device to the second location;
    causing the device to execute the command data;
    after generating the command data, receiving second input data corresponding to a first user profile;
    determining that the second input data represents the first input command;
    determining that the first input command includes a third portion corresponding to a second mechanical operation of the device;
    determining that the second mechanical operation corresponds to a first category;
    based at least in part on the first category, determining a third mechanical operation corresponding to the first category and the first user profile; and
    causing the device to perform the at least one first mechanical operation and the third mechanical operation in response to the second input data.

2. The computer-implemented method of claim 1, further comprising:
    storing third data associating the first user profile, the first input command, the at least one first mechanical operation, and the third mechanical operation.

3. The computer-implemented method of claim 1, further comprising:
    determining that the first input data corresponds to a second user profile;
    after causing the device to execute the command data, determining third input data representing the first input command;
    determining that the third input data corresponds to the second user profile; and
    after determining that the third input data corresponds to the second user profile, causing the device to execute the command data.

4. The computer-implemented method of claim 1, further comprising:
    determining that the first input data corresponds to a second user profile;
    determining that the second input data corresponds to the first user profile; and
    determining that the second user profile includes an indication of permission corresponding to the first user profile;
    wherein determining the third mechanical operation corresponding to the first category and the first user profile is further based at least in part on the second user profile including the indication.

5. The computer-implemented method of claim 1, further comprising:
    determining that at least a portion of the first input data includes image data; and
    determining that a gesture is represented in the image data,
    wherein causing the device to execute the command data corresponds to the gesture.

6. The computer-implemented method of claim 1, further comprising:
    prior to causing the device to execute the command data, determining the at least one first mechanical operation is potentially associated with damage to the device upon execution of the command data;
    receiving third input data corresponding to a potential risk of damage to the device; and
    processing the third input data to determine the device is unlikely to be damaged upon execution of the command data.

7. The computer-implemented method of claim 1, further comprising:
    after causing the device to execute the command data, determining third input data representing the first input command;
    determining third data representing an environmental condition of the device; and
    determining that the device is incapable of execution of the command data in accordance with the third data.

8. The computer-implemented method of claim 1, wherein the second mechanical operation corresponds to a second user profile.

9. The computer-implemented method of claim 1, further comprising:
    causing the device to output a prompt to provide the further information; and
    determining the first data based on receipt of the further information in response to the prompt.

10. A device comprising:
    at least one processor; and
    at least one memory including instructions that, when executed by the at least one processor, cause the device to:
        determine first input data representing a first input command to the device, the first input data corresponding to movement of the device;

determine the first input command is an unknown command for the device;
determine that further information is required to configure the device to perform the first input command;
determine first data representing a first known command corresponding to at least a first portion of the first input data, the first known command corresponding to at least one first mechanical operation for moving the device to a first location;
determine a second data representing a second location corresponding to a second portion of the first input data;
generate, using the at least one first mechanical operation of the first data and the second data, command data representing at least one second mechanical operation for moving the device to the second location;
cause the device to execute the command data;
after generating the command data, receive second input data corresponding to a first user profile;
determine that the second input data represents the first input command:
determine that the first input command includes a third portion corresponding to a second mechanical operation of the device;
determine that the second mechanical operation corresponds to a first category;
based at least in part on the first category, determine a third mechanical operation corresponding to the first category and the first user profile; and
cause the device to perform the at least one first mechanical operation and the third mechanical operation in response to the second input data.

11. The device of claim 10, wherein the at least one memory further comprises instructions that, when executed by the at least one processor, further cause the device to:
store third data associating the first user profile, the first input command, the at least one first mechanical operation, and the third mechanical operation.

12. The device of claim 10, wherein the at least one memory further comprises instructions that, when executed by the at least one processor, further cause the device to:
determine that the first input data corresponds to a second user profile;
after causing the device to execute the command data, determine third input data representing the first input command;
determine that the third input data corresponds to the second user profile; and
after determination that the third input data corresponds to the second user profile, cause the device to execute the command data.

13. The device of claim 10, wherein the at least one memory further comprises instructions that, when executed by the at least one processor, further cause the device to:
determine that the first input data corresponds to a second user profile;
determine that the second input data corresponds to the first user profile;
determine that the second user profile includes an indication of permission corresponding to the first user profile; and
determine the third mechanical operation corresponding to the first category and the first user profile further based at least in part on the second user profile including the indication.

14. The device of claim 10, wherein the at least one memory further comprises instructions that, when executed by the at least one processor, further cause the device to:
determine that at least a portion of the first input data includes image data; and
determine that a gesture is represented in the image data, wherein causing the device to execute the command data corresponds to the gesture.

15. The device of claim 10, wherein the at least one memory further comprises instructions that, when executed by the at least one processor, further cause the device to:
prior to causing the device to execute the command data, determine the at least one first mechanical operation is potentially associated with damage to the device upon execution of the command data;
receive third input data corresponding to a potential risk of damage to the device; and
process the third input data to determine the device is unlikely to be damaged upon execution of the command data.

16. The device of claim 10, wherein the at least one memory further comprises instructions that, when executed by the at least one processor, further cause the device to:
after causing the device to execute the command data, determine third input data representing the first input command;
determine third data representing an environmental condition of the device; and
determine that the device is incapable of execution of the command data in accordance with the third data.

17. The device of claim 10, wherein the second mechanical operation corresponds to a second user profile.

18. The device of claim 10, wherein the at least one memory further comprises instructions that, when executed by the at least one processor, further cause the device to:
output a prompt to provide the further information; and
determine the first data based on receipt of the further information in response to the prompt.

* * * * *